(12) United States Patent
Huang

(10) Patent No.: US 8,472,128 B2
(45) Date of Patent: Jun. 25, 2013

(54) OPTICAL IMAGE CAPTURING LENS ASSEMBLY

(75) Inventor: Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 108 days.

(21) Appl. No.: 13/303,041

(22) Filed: Nov. 22, 2011

(65) Prior Publication Data

US 2013/0003193 A1 Jan. 3, 2013

(30) Foreign Application Priority Data

Jun. 28, 2011 (TW) .............................. 100122671 A

(51) Int. Cl.
*G02B 9/62* (2006.01)
*G02B 3/02* (2006.01)
(52) U.S. Cl.
USPC .......................................... 359/713; 359/757
(58) Field of Classification Search
CPC ................. G02B 3/02; G02B 9/62; G02B 9/64
USPC .................... 359/708, 713, 754–757, 759
See application file for complete search history.

(56) References Cited

U.S. PATENT DOCUMENTS

| 7,502,181 | B2 | 3/2009 | Shinohara |
| 8,385,006 | B2 * | 2/2013 | Tsai et al. ................... 359/713 |
| 8,390,940 | B2 * | 3/2013 | Tsai et al. ................... 359/713 |

* cited by examiner

*Primary Examiner* — Darryl J Collins
(74) *Attorney, Agent, or Firm* — Morris Manning & Martin LLP; Tim Tingkang Xia, Esq.

(57) ABSTRACT

The present disclosure provides an optical image capturing lens assembly comprising, in order from an object side to an image side: a first lens element with positive refractive power having a convex image-side surface; a second lens element; a third lens element; a fourth lens element, at least one of an object-side surface and an image-side surface thereof being aspheric; a fifth lens element, at least one of an object-side surface and an image-side surface thereof being aspheric; and a sixth lens element with negative refractive power having a concave image-side surface, at least one of an object-side surface and the image-side surface thereof being aspheric, at least one inflection point being formed on at least one of the surfaces thereof. With the aforementioned arrangements, the sensitivity of the optical system can be attenuated while the aberration and astigmatism can be effectively corrected to improve the image quality.

21 Claims, 19 Drawing Sheets

OPTICAL IMAGE CAPTURING LENS ASSEMBLY

CROSS-REFERENCE TO RELATED APPLICATIONS

This non-provisional application claims priority under 35 U.S.C. §119(a) on Patent Application No. 100122671 filed in Taiwan, R.O.C. on Jun. 28, 2011, the entire contents of which are hereby incorporated by reference.

BACKGROUND

1. Technical Field

The present disclosure relates to an optical image capturing lens assembly, and more particularly, to a compact optical image capturing lens assembly used in electronic products.

2. Description of the Prior Art

With advances in technology and the popularity of mobile phone cameras, the demand for compact imaging lens assembly is increasing. The sensor of a general imaging lens assembly is none other than CCD (Charge Coupled Device) or CMOS (Complementary Metal Oxide Semiconductor). As advances in semiconductor manufacturing technology have allowed the pixel size of sensors to be reduced, and the resolution of compact imaging lens assembly has gradually increased, there is an increasing demand for compact imaging lens assembly featuring better image quality.

Generally, a conventional compact imaging lens assembly with high image quality for portable electronic products, such as the one disclosed in U.S. Pat. No. 7,502,181, is composed of five lens elements. As the popularity of high profile mobile devices such as smart phones and PDAs (Personal Digital Assistant) has led to a rapid increase in the resolution and image quality of compact imaging lens assemblies, a conventional lens assembly with five lens elements has become insufficient for high-end imaging lens modules. Moreover, electronic products have become more compact and powerful; therefore, a need exists in the art for an optical image capturing lens assembly that features better image quality, maintains a moderate total track length and is applicable to compact portable electronic products.

SUMMARY

The present disclosure provides an optical image capturing lens assembly comprising, in order from an object side to an image side: a first lens element with positive refractive power having a convex image-side surface; a second lens element; a third lens element; a fourth lens element, at least one of an object-side surface and an image-side surface thereof being aspheric; a fifth lens element, at least one of an object-side surface and an image-side surface thereof being aspheric; and a sixth lens element with negative refractive power having a concave image-side surface, at least one of an object-side surface and the image-side surface thereof being aspheric, at least one inflection point being formed on at least one of the object-side surface and the image-side surface thereof; wherein the optical image capturing lens assembly further comprises a stop; and wherein a radius of curvature of the image-side surface of the first lens element is R2, a radius of curvature of an object-side surface of the first lens element is R1, an axial distance between the stop and the image-side surface of the sixth lens element is SD, an axial distance between the object-side surface of the first lens element and the image-side surface of the sixth lens element is TD, and they satisfy the following relations: $-1.0<R2/|R1|<0$; and $0.7<SD/TD<1.2$.

The present disclosure provides another optical image capturing lens assembly comprising, in order from an object side to an image side: a first lens element with positive refractive power having a convex image-side surface; a second lens element with negative refractive power; a third lens element; a fourth lens element; a fifth lens element with positive refractive power having a convex image-side surface, at least one of an object-side surface and the image-side surface thereof being aspheric; and a sixth lens element with negative refractive power having a concave image-side surface, at least one of an object-side surface and the image-side surface thereof being aspheric, at least one inflection point being formed on at least one of the object-side surface and the image-side surface thereof; wherein the optical image capturing lens assembly further comprises an image sensor disposed on an image plane; and wherein a radius of curvature of the image-side surface of the first lens element is R2, a radius of curvature of an object-side surface of the first lens element is R1, a vertical distance between a point with its tangent being perpendicular to the optical axis on the image-side surface of the sixth lens element and the optical axis is Yc, half of a diagonal length of an effective photosensitive area of the image sensor is ImgH, and they satisfy the following relations: $-1.0<R2/|R1|<0$; and $0.4<Yc/ImgH<0.9$.

With the aforementioned arrangement of lens elements, the sensitivity of the optical system can be attenuated, and the size of the lens assembly can be reduced. Furthermore, the aberration and astigmatism of the system can be effectively corrected to improve the image quality.

In the present optical image capturing lens assembly, the first lens element with positive refractive power provides the majority of the refractive power of the system so as to favorably reduce the total track length. When the second lens element has negative refractive power, the aberration of the system can be effectively corrected. When the fifth lens element has positive refractive power, the refractive power of the system can be distributed in a more balanced manner and the sensitivity thereof can be also reduced. When the sixth lens element has negative refractive power, the aberration of the system can be favorably corrected.

In the present optical image capturing lens assembly, when the first lens element has a convex image-side surface, the positive refractive power thereof can be enhanced and the total track length of the lens assembly can be reduced. When the fifth lens element has a convex image-side surface, the total track length can be favorably reduced. When the sixth lens element has a concave image-side surface, the principal point of the system can be effectively positioned away from the image plane, thereby reducing the total track length of the system.

DETAILED DESCRIPTION OF THE PREFERRED EMBODIMENTS

Figure 1A:
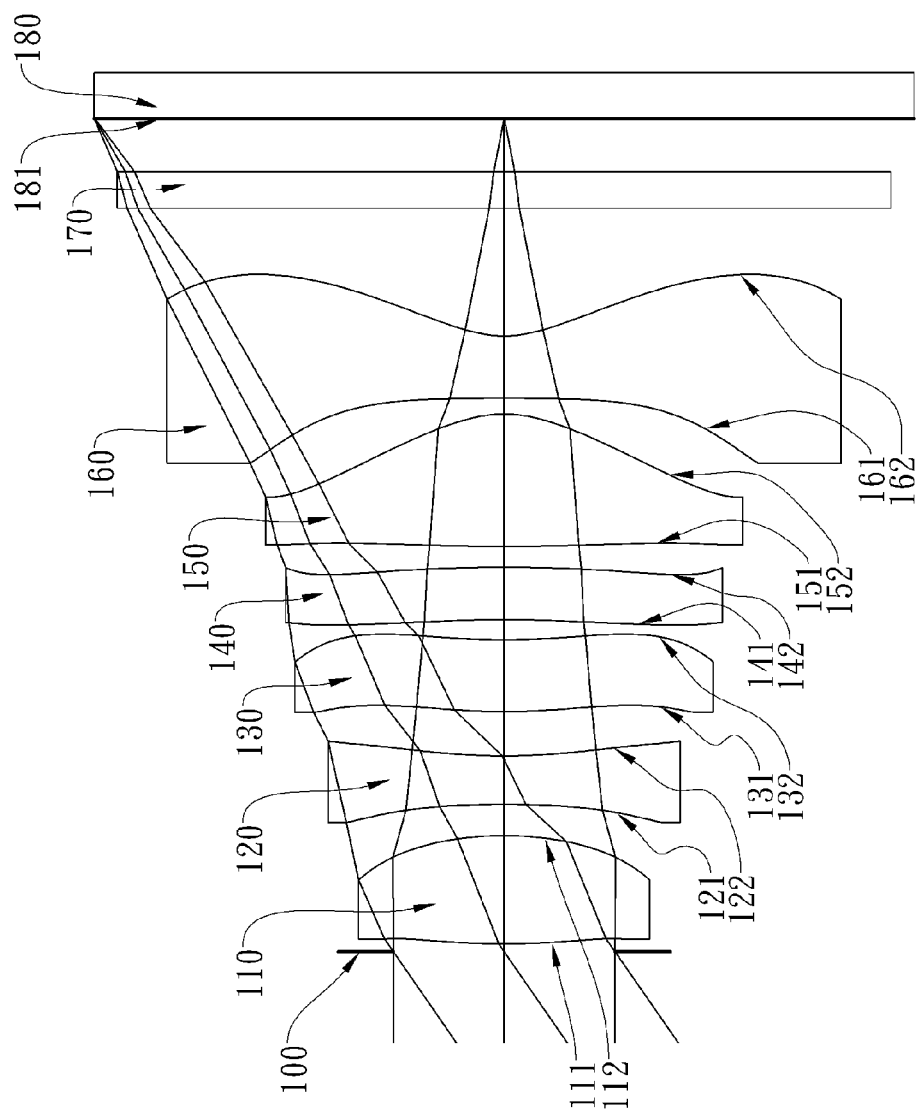
FIG. 1A shows an optical image capturing lens assembly in accordance with a first embodiment of the present disclosure.

The present disclosure provides an optical image capturing lens assembly comprising, in order from an object side to an image side: a first lens element with positive refractive power having a convex image-side surface; a second lens element; a third lens element; a fourth lens element, at least one of an object-side surface and an image-side surface thereof being aspheric; a fifth lens element, at least one of an object-side surface and an image-side surface thereof being aspheric; and a sixth lens element with negative refractive power having a concave image-side surface, at least one of an object-side surface and the image-side surface thereof being aspheric, at least one inflection point being formed on at least one of the object-side surface and the image-side surface thereof; wherein the optical image capturing lens assembly further comprises a stop; and wherein a radius of curvature of the image-side surface of the first lens element is R2, a radius of curvature of an object-side surface of the first lens element is R1, an axial distance between the stop and the image-side surface of the sixth lens element is SD, an axial distance between the object-side surface of the first lens element and the image-side surface of the sixth lens element is TD, and they satisfy the following relations: $-1.0<R2/|R1|<0$; and $0.7<SD/TD<1.2$.

When the relation of $-1.0<R2/|R1|<0$ is satisfied, the spherical aberration of the system can be favorably corrected.

When the relation of $0.7<SD/TD<1.2$ is satisfied, the field of view can be favorably enlarged. Preferably, SD and TD satisfy the following relation: $0.9<SD/TD<1.2$.

In the aforementioned optical image capturing lens assembly, a radius of curvature of the image-side surface of the sixth lens element is R12, a focal length of the optical image capturing lens assembly is f, and they preferably satisfy the following relation: $0<R12/f<1.0$. When the above relation is satisfied, the astigmatism of the system can be effectively corrected to improve the image quality.

In the aforementioned optical image capturing lens assembly, a focal length of the first lens element is f1, a focal length of the third lens element is f3, and they preferably satisfy the following relation: $|f1/f3|<1.0$. When the above relation is satisfied, the refractive power of the first lens element and the third lens element can be distributed in a more balanced manner and thereby to favorably correct the aberration and attenuate the sensitivity. And it will be more preferable that f1 and f3 satisfy the following relation: $|f1/f3|<0.5$.

In the aforementioned optical image capturing lens assembly, a sum of axial thickness of all lens elements is $\Sigma CT$, an axial distance between the object-side surface of the first lens element and the image-side surface of the sixth lens element is TD, and they preferably satisfy the following relation: $0.65<\Sigma CT/TD<0.85$. When the above relation is satisfied, the thickness of each lens element in the optical image capturing lens assembly is more appropriate for the assembly and spatial arrangement of the lens elements.

In the aforementioned optical image capturing lens assembly, an Abbe number of the first lens element is V1, an Abbe number of the second lens element is V2, and they preferably satisfy the following relation: $20<V1-V2<45$. When the above relation is satisfied, the chromatic aberration of the system can be effectively corrected.

In the aforementioned optical image capturing lens assembly, the radius of curvature of the image-side surface of the sixth lens element is R12, the focal length of the optical image capturing lens assembly is f, and they preferably satisfy the following relation: $0.1<R12/f<0.5$. When the above relation is satisfied, the astigmatism of the system can be effectively eliminated to improve the image quality. When the sixth lens element has negative refractive power and the image-side surface thereof is concave, the principal point of the system can be positioned away from the image plane, thereby reducing the total track length of the lens assembly.

In the aforementioned optical image capturing lens assembly, the focal length of the optical image capturing lens assembly is f, the focal length of the third lens element is f3, a focal length of the fourth lens element is f4, a focal length of the fifth lens element is f5, a focal length of the sixth lens element is f6, and they preferably satisfy the following relation: $0<(|f/f3|+|f/f4|)/(|f/f5|+|f/f6|)<0.4$. When the above relation is satisfied, the refractive power of the third and fourth lens elements can cooperate with the refractive power of the fifth and sixth lens elements to effectively correct the aberration of the system and to favorably reduce the total track length of the system.

The aforementioned optical image capturing lens assembly further comprises an image sensor disposed on the image plane. In the aforementioned optical image capturing lens assembly, a vertical distance between a point with its tangent being perpendicular to the optical axis on the image-side surface of the sixth lens element and the optical axis is Yc, half of a diagonal length of an effective photosensitive area of the image sensor is ImgH, and they preferably satisfy the following relation: $0.4<Yc/ImgH<0.9$. When the above relation is satisfied, the angle at which light projects onto the image sensor from the off-axis field can be effectively reduced, and the off-axis aberrations can be further corrected.

In the aforementioned optical image capturing lens assembly, an axial distance between the object-side surface of the first lens element and the image plane is TTL, half of the diagonal length of the effective photosensitive area of the image sensor is ImgH, and they preferably satisfy the following relation: TTL/ImgH<2.2. The satisfaction of the above relation enables the optical image capturing lens assembly to maintain a compact form so that it can be installed in compact portable electronic products.

The present disclosure provides another optical image capturing lens assembly comprising, in order from an object side to an image side: a first lens element with positive refractive power having a convex image-side surface; a second lens element with negative refractive power; a third lens element; a fourth lens element; a fifth lens element with positive refractive power having a convex image-side surface, at least one of an object-side surface and the image-side surface thereof being aspheric; and a sixth lens element with negative refractive power having a concave image-side surface, at least one of an object-side surface and the image-side surface thereof being aspheric, at least one inflection point being formed on at least one of the object-side surface and the image-side surface thereof; wherein the optical image capturing lens assembly further comprises an image sensor disposed on an image plane; and wherein a radius of curvature of the image-side surface of the first lens element is R2, a radius of curvature of an object-side surface of the first lens element is R1, a vertical distance between a point with its tangent being perpendicular to the optical axis on the image-side surface of the sixth lens element and the optical axis is Yc, half of a diagonal length of an effective photosensitive area of the image sensor is ImgH, and they satisfy the following relations: $-1.0<R2/|R1|<0$; and $0.4<Yc/ImgH<0.9$.

When the relation of $-1.0<R2/|R1|<0$ is satisfied, the spherical aberration of the system can be favorably corrected.

When the relation of $0.4<Yc/ImgH<0.9$ is satisfied, the angle at which light projects onto the image sensor from the off-axis field can be effectively reduced, and the off-axis aberrations can be further corrected.

In the aforementioned optical image capturing lens assembly, an Abbe number of the first lens element is V1, an Abbe number of the second lens element is V2, and they preferably satisfy the following relation: $20<V1-V2<45$. When the above relation is satisfied, the chromatic aberration of the system can be favorably corrected.

The aforementioned optical image capturing lens assembly further comprises a stop. An axial distance between the stop and the image-side surface of the sixth lens element is SD, an axial distance between the object-side surface of the first lens element and the image-side surface of the sixth lens element is TD, and they preferably satisfy the following relation: $0.9<SD/TD<1.2$. When the above relation is satisfied, the field of view can be favorably enlarged. And it will be more preferable that SD and TD satisfy the following relation: $0.7<SD/TD<1.2$.

In the aforementioned optical image capturing lens assembly, an axial distance between the first lens element and the second lens element is T12, an axial distance between the fifth lens element and the sixth lens element is T56, and they preferably satisfy the following relation: $0.3<T12/T56<2.5$. When the above relation is satisfied, the spacing between lens elements is not excessively large or small. Consequently, it is favorable not only for the assembly of the lens elements but also for the efficient spatial arrangement of the lens assembly in order to keep the lens assembly compact In the aforementioned optical image capturing lens assembly, a focal length of the optical image capturing lens assembly is f, a focal length of the third lens element is f3, a focal length of the fourth lens element is f4, a focal length of the fifth lens element is f5, a focal length of the sixth lens element is f6, and they preferably satisfy the following relation: $0<(|f/f3|+|f/f4|)/(|f/f5|+|f/f6|)<0.4$. When the above relation is satisfied, the refractive power of the third and fourth lens elements can cooperate with the refractive power of the fifth and sixth lens elements to effectively correct the aberration of the system and to favorably reduce the total track length of the system.

In the aforementioned optical image capturing lens assembly, a radius of curvature of the image-side surface of the sixth lens element is R12, the focal length of the optical image capturing lens assembly is f, and they preferably satisfy the following relation: $0.1<R12/f<0.5$. When the above relation is satisfied, the astigmatism of the system can be effectively corrected to improve the image quality.

In the aforementioned optical image capturing lens assembly, a focal length of the first lens element is f1, the focal length of the third lens element is f3, and they preferably satisfy the following relation: $|f1/f3|<0.5$. When the above relation is satisfied, the refractive power of the first lens element and the third lens element can be distributed in a more balanced manner and thereby to favorably correct the aberration and attenuate the sensitivity.

In the aforementioned optical image capturing lens assembly, an axial distance between the object-side surface of the first lens element and the image plane is TTL, half of the diagonal length of the effective photosensitive area of the image sensor is ImgH, and they preferably satisfy the following relation: TTL/ImgH<2.2. The satisfaction of the above relation enables the optical image capturing lens assembly to maintain a compact form so that it can be installed in compact portable electronic products.

In the present optical image capturing lens assembly, the lens elements can be made of glass or plastic material. If the lens elements are made of glass, the freedom for distributing the refractive power of the optical image capturing lens assembly can be increased. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements used in an optical system. Consequently, the total track length of the optical image capturing lens assembly can be effectively reduced.

In the present optical image capturing lens assembly, if a lens element has a convex surface, it means the portion of the surface in proximity to the optical axis is convex; if a lens element has a concave surface, it means the portion of the surface in proximity to the optical axis is concave.

The present optical image capturing lens assembly can be provided with at least one stop, such as a glare stop or a field stop, to eliminate stray light, thereby the image quality can be favorably improved.

Figure 10:
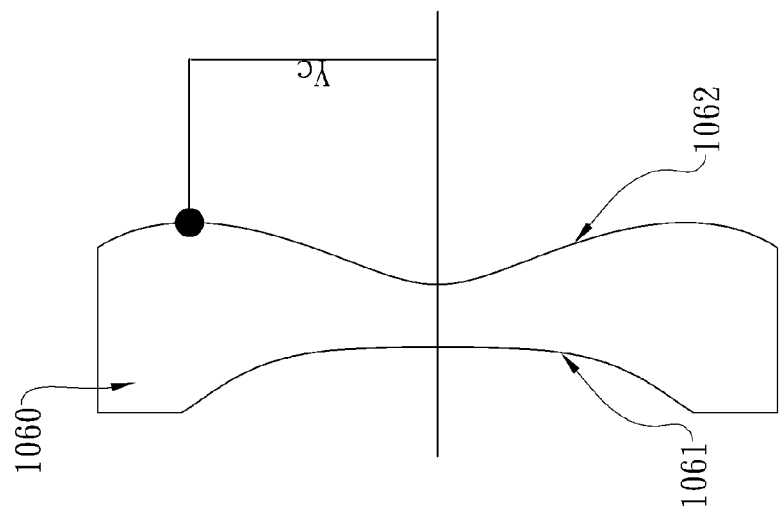
FIG. 10 shows the distance and the relative location represented by Yc.

The distance and relative location represented by Yc will be further illustrated in FIG. 10. Yc is a vertical distance between a point with its tangent being perpendicular to the optical axis on the image-side surface 1062 of the sixth lens element 1060 and the optical axis, and the point excludes crossing the optical axis.

Preferred embodiments of the present disclosure will be described in the following paragraphs by referring to the accompanying drawings.

Embodiment 1

Figure 1B:
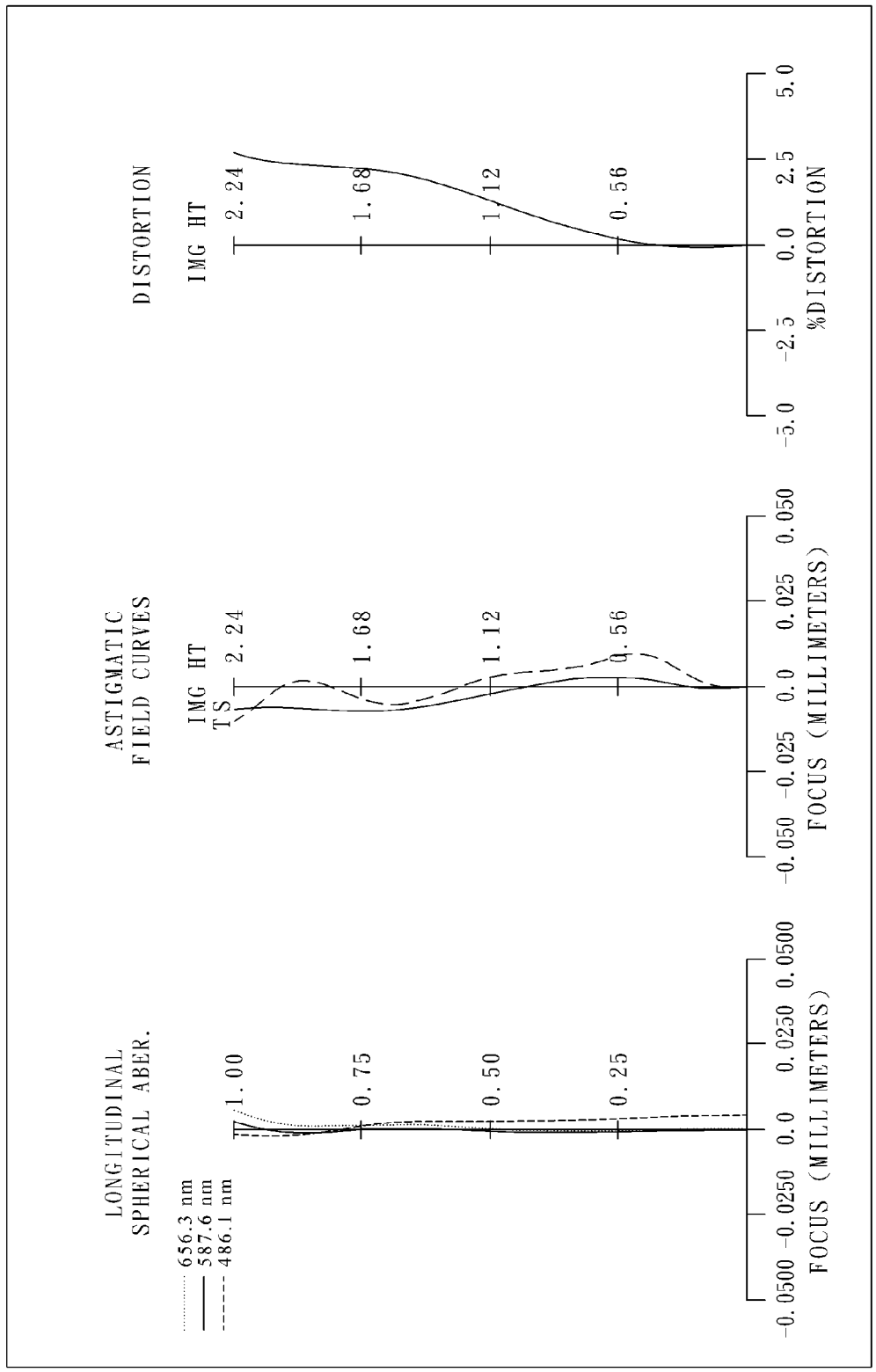
FIG. 1B shows the aberration curves of the first embodiment of the present disclosure.

FIG. 1A shows an optical image capturing lens assembly in accordance with a first embodiment of the present disclosure, and FIG. 1B shows the aberration curves of the first embodiment of the present disclosure. In the first embodiment of the present disclosure, there is an optical image capturing lens assembly mainly comprising six lens elements, in order from an object side to an image side:

a plastic first lens element 110 with positive refractive power having a convex object-side surface 111 and a convex image-side surface 112, the object-side surface 111 and the image-side surface 112 thereof being aspheric;

a plastic second lens element 120 with negative refractive power having a concave object-side surface 121 and a concave image-side surface 122, the object-side surface 121 and the image-side surface 122 thereof being aspheric;

a plastic third lens element 130 with positive refractive power having a convex object-side surface 131 and a concave image-side surface 132, the object-side surface 131 and the image-side surface 132 thereof being aspheric;

a plastic fourth lens element 140 with negative refractive power having a concave object-side surface 141 and a convex image-side surface 142, the object-side surface 141 and the image-side surface 142 thereof being aspheric;

a plastic fifth lens element 150 with positive refractive power having a convex object-side surface 151 and a convex image-side surface 152, the object-side surface 151 and the image-side surface 152 thereof being aspheric; and a plastic sixth lens element 160 with negative refractive power having a concave object-side surface 161 and a concave image-side surface 162 on which at least one inflection point is formed, the object-side surface 161 and the image-side surface 162 thereof being aspheric.

The optical image capturing lens assembly is also provided with a stop 100 disposed between an imaged object and the first lens element 110.

The optical image capturing lens assembly further comprises an IR-filter 170 disposed between the image-side surface 162 of the sixth lens element 160 and an image plane 181; the IR-filter 170 is made of glass and has no influence on the focal length of the optical image capturing lens assembly. Moreover, an image sensor 180 is disposed on the image plane 181.

The detailed optical data of the first embodiment is shown in TABLE 1, and the aspheric surface data is shown in TABLE 2, wherein the units of the radius of curvature, the thickness and the focal length are expressed in mm, and HFOV is half of the maximal field of view.

TABLE 1

(Embodiment 1)
f = 3.15 mm, Fno = 2.60, HFOV = 34.7 deg.

| Surface # | | Radius of Curvature | Thickness | Material | Refractive Index | Abbe # | Focal Length |
|---|---|---|---|---|---|---|---|
| 0 | Imaged Object | Plano | Infinity | | | | |
| 1 | Stop | Plano | 0.042 | | | | |
| 2 | Lens 1 | 3.706800 (ASP) | 0.593 | Plastic | 1.544 | 55.9 | 2.36 |
| 3 | | −1.853420 (ASP) | 0.171 | | | | |
| 4 | Lens 2 | −5.358100 (ASP) | 0.265 | Plastic | 1.634 | 23.8 | −3.06 |
| 5 | | 3.100500 (ASP) | 0.243 | | | | |
| 6 | Lens 3 | 3.147000 (ASP) | 0.394 | Plastic | 1.544 | 55.9 | 26.35 |
| 7 | | 3.853900 (ASP) | 0.110 | | | | |
| 8 | Lens 4 | −6.229200 (ASP) | 0.286 | Plastic | 1.544 | 55.9 | −30.58 |
| 9 | | −10.117000 (ASP) | 0.115 | | | | |
| 10 | Lens 5 | 11.501500 (ASP) | 0.725 | Plastic | 1.544 | 55.9 | 1.18 |
| 11 | | −0.664450 (ASP) | 0.086 | | | | |
| 12 | Lens 6 | −25.000000 (ASP) | 0.341 | Plastic | 1.530 | 55.8 | −1.08 |
| 13 | | 0.588550 (ASP) | 0.700 | | | | |
| 14 | IR-filter | Plano | 0.200 | Glass | 1.517 | 64.2 | — |
| 15 | | Plano | 0.290 | | | | |
| 16 | Image Plane | Plano | — | | | | |

\* Reference Wavelength is d-line 587.6 nm

TABLE 2

Aspheric Coefficients

| Surface # | 2 | 3 | 4 | 5 | 6 | 7 |
|---|---|---|---|---|---|---|
| k = | −5.72351E+01 | −2.93930E+00 | 6.05450E−01 | −2.35567E+01 | −1.86976E+01 | −3.68752E−01 |
| A4 = | 3.84351E−02 | −1.09407E−01 | −3.43399E−02 | −2.90346E−02 | −1.38124E−01 | −1.16066E−01 |
| A6 = | −3.59424E−01 | −1.69034E−01 | −1.72809E−01 | −4.31900E−02 | −4.54925E−02 | −8.85093E−02 |
| A8 = | 3.36789E−01 | 1.79247E−02 | 3.92370E−01 | 1.54637E−01 | 2.49431E−01 | 1.10300E−01 |
| A10 = | −5.18074E−01 | 1.14204E−01 | −6.89319E−01 | −3.55990E−01 | −3.14677E−01 | −9.65330E−02 |
| A12 = | −1.67515E−02 | −1.97931E−01 | 9.27853E−01 | 3.85117E−01 | 1.33156E−01 | 2.99398E−02 |
| A14 = | −9.01783E−03 | −4.21505E−03 | −4.71235E−01 | −1.38476E−01 | | |

| Surface # | 8 | 9 | 10 | 11 | 12 | 13 |
|---|---|---|---|---|---|---|
| k = | 2.44726E+01 | 1.99921E+01 | −2.00000E+01 | −4.62452E+00 | −1.00000E+00 | −5.27621E+00 |
| A4 = | 8.35723E−02 | −1.29264E−02 | −2.73600E−02 | −7.27893E−02 | −7.91567E−02 | −9.70641E−02 |
| A6 = | 4.92063E−02 | 8.89125E−03 | 8.98680E−03 | 1.40420E−01 | −4.19947E−02 | 3.84345E−02 |

TABLE 2-continued

Aspheric Coefficients

| | | | | | | |
|---|---|---|---|---|---|---|
| A8 = | −2.30157E−01 | 1.29232E−02 | −7.89870E−03 | −1.22672E−01 | 3.03688E−02 | −1.31556E−02 |
| A10 = | 3.00894E−01 | 4.85775E−03 | −7.90963E−04 | 6.63931E−02 | −6.62147E−03 | 2.53253E−03 |
| A12 = | −1.70101E−01 | −8.71959E−04 | 2.04908E−03 | −1.69660E−02 | −1.28050E−03 | −2.38698E−04 |
| A14 = | 3.86560E−02 | | | 2.02570E−03 | 1.03221E−03 | 4.57673E−06 |

The equation of the aspheric surface profiles is expressed as follows:

$$X(Y) = (Y^2/R)/(1 + sqrt(1 - (1+k)*(Y/R)^2)) + \sum_{i}(Ai)*(Y^i)$$

wherein:

X: the height of a point on the aspheric surface at a distance Y from the
optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical image capturing lens assembly, the focal length of the optical image capturing lens assembly is f, and it satisfies the relation: f=3.15 (mm).

In the first embodiment of the present optical image capturing lens assembly, the f-number of the optical image capturing lens assembly is Fno, and it satisfies the relation: Fno=2.60.

In the first embodiment of the present optical image capturing lens assembly, half of the maximal field of view of the optical image capturing lens assembly is HFOV, and it satisfies the relation: HFOV=34.7 deg.

In the first embodiment of the present optical image capturing lens assembly, the Abbe number of the first lens element 110 is V1, the Abbe number of the second lens element 120 is V2, and they satisfy the relation: V1−V2=32.1.

In the first embodiment of the present optical image capturing lens assembly, the axial distance between the image-side surface 112 of the first lens element 110 and the object-side surface 121 of the second lens element 120 is T12, the axial distance between the image-side surface 152 of the fifth lens element 150 and the object-side surface 161 of the sixth lens element 160 is T56, and they satisfy the relation: T12/T56=1.99

In the first embodiment of the present optical image capturing lens assembly, the sum of axial thickness of all lens elements (110, 120, 130, 140, 150 and 160) is ΣCT, the axial distance between the object-side surface 111 of the first lens element 110 and the image-side surface 162 of the sixth lens element 160 is TD, and they satisfy the relation: ΣCT/TD=0.78.

In the first embodiment of the present optical image capturing lens assembly, the radius of curvature of the image-side surface 112 of the first lens element 110 is R2, the radius of curvature of the object-side surface 111 of the first lens element 110 is R1, and they satisfy the relation: R2/|R1|=−0.50.

In the first embodiment of the present optical image capturing lens assembly, the radius of curvature of the image-side surface 162 of the sixth lens element 160 is R12, the focal length of the optical image capturing lens assembly is f, and they satisfy the relation: R12/f=0.19.

In the first embodiment of the present optical image capturing lens assembly, the focal length of the first lens element 110 is f1, the focal length of the third lens element 130 is f3, and they satisfy the relation: |f1/f3|=0.09.

In the first embodiment of the present optical image capturing lens assembly, the focal length of the optical image capturing lens assembly is f, the focal length of the third lens element 130 is f3, the focal length of the fourth lens element 140 is f4, the focal length of the fifth lens element 150 is f5, the focal length of the sixth lens element 160 is f6, and they satisfy the relation: (|f/f3|+|f/f4|)/(|f/f5|+|f/f6|)=0.04.

In the first embodiment of the present optical image capturing lens assembly, the axial distance between the stop 100 and the image-side surface 162 of the sixth lens element 160 is SD, the axial distance between the object-side surface 111 of the first lens element 110 and the image-side surface 162 of the sixth lens element 160 is TD, and they satisfy the relation: SD/TD=1.01.

The first embodiment of the present optical image capturing lens assembly further comprises an image sensor 180 disposed on an image plane 181. The vertical distance between a point with its tangent being perpendicular to the optical axis on the image-side surface 162 of the sixth lens element 160 and the optical axis is Yc, half of the diagonal length of the effective photosensitive area of the image sensor is ImgH, and they satisfy the relation: Yc/ImgH=0.60.

In the first embodiment of the present optical image capturing lens assembly, the axial distance between the object-side surface 111 of the first lens element 110 and the image plane 181 is TTL, half of the diagonal length of the effective photosensitive area of the image sensor 180 is ImgH, and they satisfy the relation: TTL/ImgH=1.99.

Embodiment 2

Figure 2A:
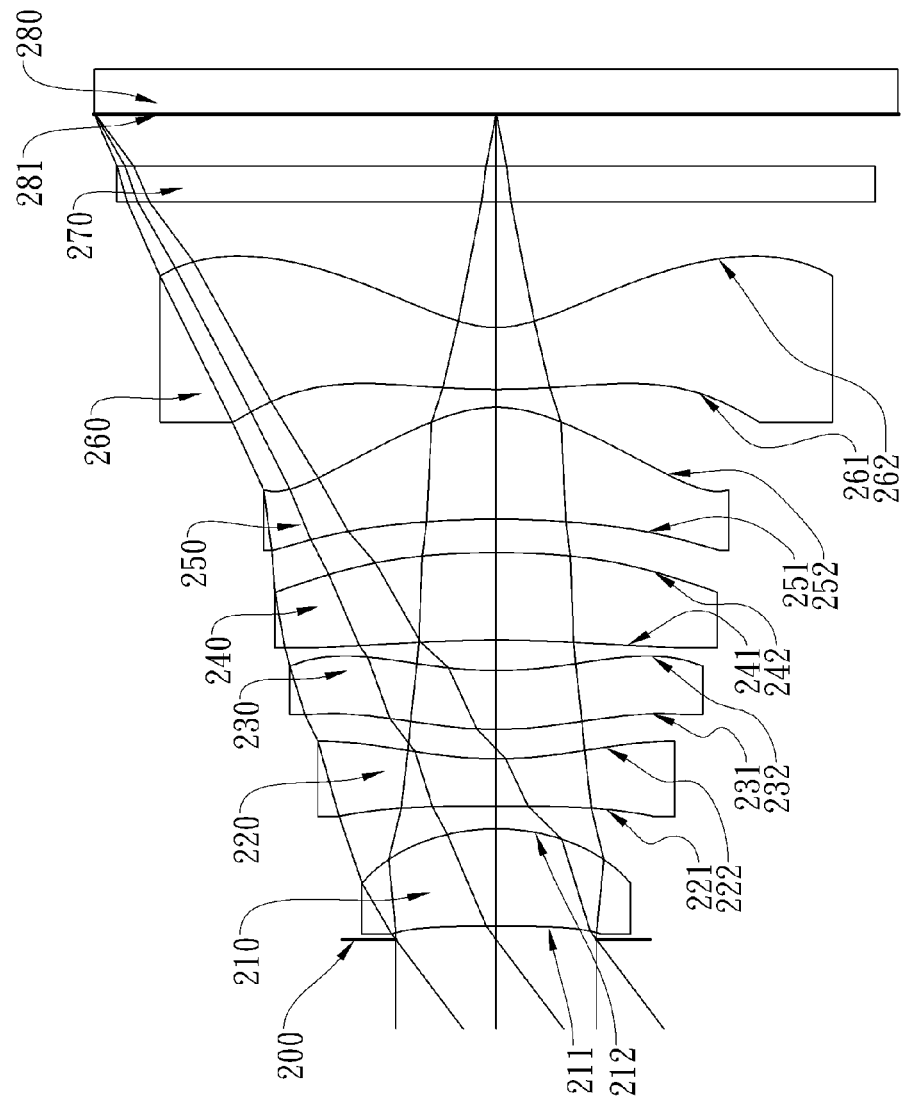
FIG. 2A shows an optical image capturing lens assembly in accordance with a second embodiment of the present disclosure.
Figure 2B:
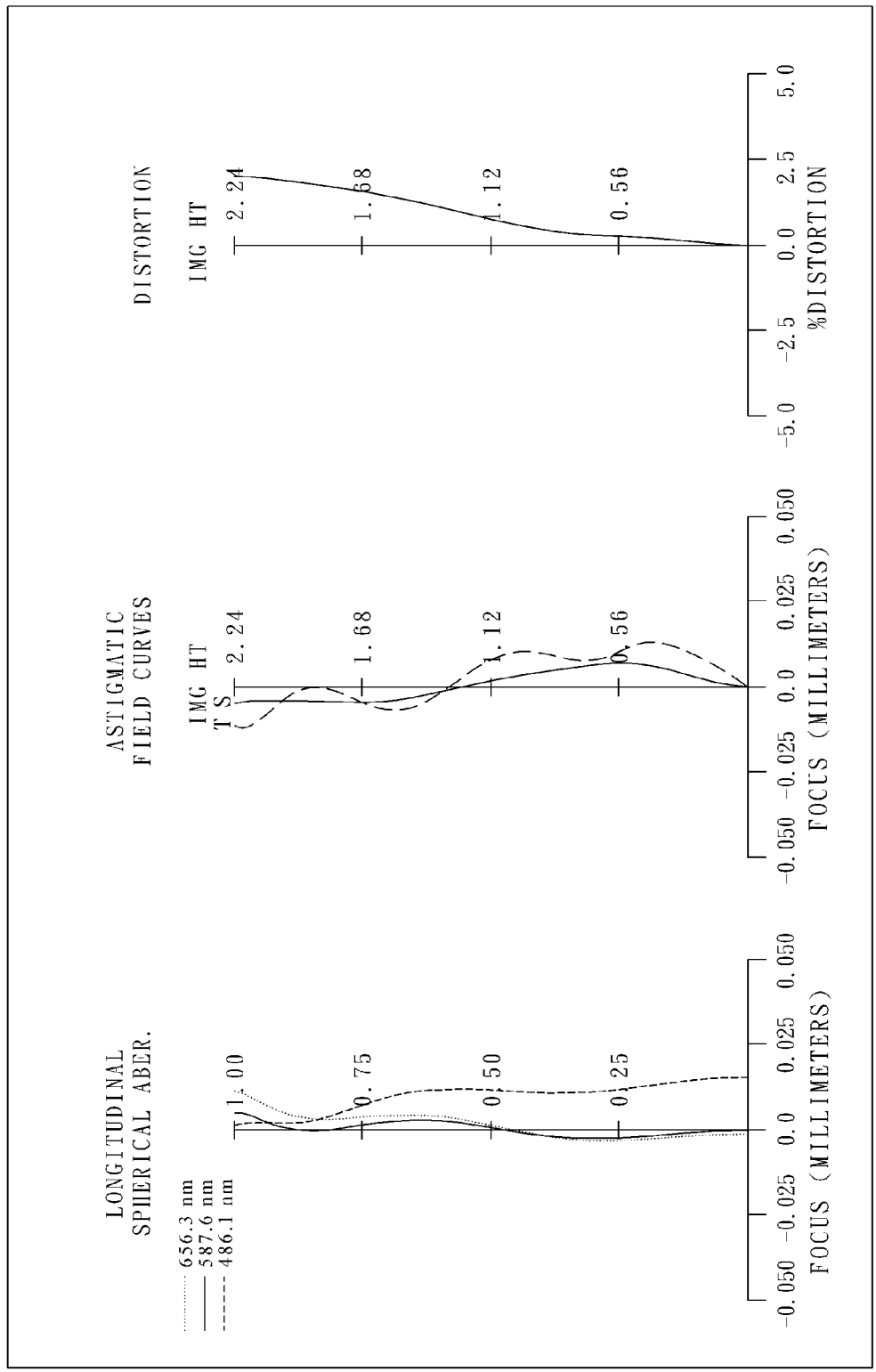
FIG. 2B shows the aberration curves of the second embodiment of the present disclosure.

FIG. 2A shows an optical image capturing lens assembly in accordance with a second embodiment of the present disclosure, and FIG. 2B shows the aberration curves of the second embodiment of the present disclosure. In the second embodiment of the present disclosure, there is an optical image capturing lens assembly mainly comprising six lens elements, in order from an object side to an image side:

a plastic first lens element 210 with positive refractive power having a concave object-side surface 211 and a convex image-side surface 212, the object-side surface 211 and the image-side surface 212 thereof being aspheric;

a plastic second lens element 220 with negative refractive power having a concave object-side surface 221 and a concave image-side surface 222, the object-side surface 221 and the image-side surface 222 thereof being aspheric;

a plastic third lens element 230 with positive refractive power having a convex object-side surface 231 and a concave image-side surface 232, the object-side surface 231 and the image-side surface 232 thereof being aspheric;

a plastic fourth lens element 240 with positive refractive power having a concave object-side surface 241 and a convex image-side surface 242, the object-side surface 241 and the image-side surface 242 thereof being aspheric;

a plastic fifth lens element 250 with positive refractive power having a concave object-side surface 251 and a convex image-side surface 252, the object-side surface 251 and the image-side surface 252 thereof being aspheric; and a plastic sixth lens element 260 with negative refractive power having a convex object-side surface 261 and a concave image-side surface 262 on which at least one inflection point is formed, the object-side surface 261 and the image-side surface 262 thereof being aspheric.

The optical image capturing lens assembly is also provided with a stop 200 disposed between an imaged object and the first lens element 210.

The optical image capturing lens assembly further comprises an IR-filter 270 disposed between the image-side surface 262 of the sixth lens element 260 and an image plane 281; the IR-filter 270 is made of glass and has no influence on the focal length of the optical image capturing lens assembly. Moreover, an image sensor 280 is disposed on the image plane 281.

The detailed optical data of the second embodiment is shown in TABLE 3, and the aspheric surface data is shown in TABLE 4, wherein the units of the radius of curvature, the thickness and the focal length are expressed in mm, and HFOV is half of the maximal field of view.

TABLE 3

(Embodiment 2)
f = 2.91 mm, Fno = 2.60, HFOV = 37.0 deg.

| Surface # | | Radius of Curvature | Thickness | Material | Refractive Index | Abbe # | Focal Length |
|---|---|---|---|---|---|---|---|
| 0 | Imaged Object | Plano | Infinity | | | | |
| 1 | Stop | Plano | 0.073 | | | | |
| 2 | Lens 1 | −28.571400 (ASP) | 0.546 | Plastic | 1.544 | 55.9 | 2.25 |
| 3 | | −1.184120 (ASP) | 0.126 | | | | |
| 4 | Lens 2 | −23.668800 (ASP) | 0.265 | Plastic | 1.650 | 21.4 | −3.03 |
| 5 | | 2.154250 (ASP) | 0.164 | | | | |
| 6 | Lens 3 | 1.992900 (ASP) | 0.329 | Plastic | 1.544 | 55.9 | 25.16 |
| 7 | | 2.196690 (ASP) | 0.170 | | | | |
| 8 | Lens 4 | −6.198900 (ASP) | 0.489 | Plastic | 1.544 | 55.9 | 34.89 |
| 9 | | −4.803100 (ASP) | 0.186 | | | | |
| 10 | Lens 5 | −5.657700 (ASP) | 0.626 | Plastic | 1.544 | 55.9 | 1.34 |
| 11 | | −0.670350 (ASP) | 0.100 | | | | |
| 12 | Lens 6 | 4.331100 (ASP) | 0.346 | Plastic | 1.530 | 55.8 | −1.27 |
| 13 | | 0.567040 (ASP) | 0.700 | | | | |
| 14 | IR-filter | Plano | 0.200 | Glass | 1.517 | 64.2 | — |
| 15 | | Plano | 0.291 | | | | |
| 16 | Image Plane | Plano | — | | | | |

\* Reference Wavelength is d-line 587.6 nm

TABLE 4

Aspheric Coefficients

| Surface # | 2 | 3 | 4 | 5 | 6 | 7 |
|---|---|---|---|---|---|---|
| k = | −1.00000E+00 | −2.59991E+00 | −1.36411E+01 | −1.77521E+01 | −1.16862E+01 | −2.80956E+00 |
| A4 = | −1.99945E−01 | −1.79133E−01 | −3.78717E−02 | −1.28666E−02 | −1.10278E−01 | −1.23346E−01 |
| A6 = | −2.95575E−01 | −2.34962E−01 | −1.57064E−01 | −5.69435E−02 | −3.55723E−02 | −7.48931E−02 |
| A8 = | 3.63156E−01 | 1.16881E−01 | 3.83114E−01 | 1.36590E−01 | 2.53623E−01 | 1.24393E−01 |
| A10 = | −1.28342E+00 | 4.38306E−02 | −7.35579E−01 | −3.65198E−01 | −3.15556E−01 | −9.31038E−02 |
| A12 = | 1.84724E−02 | −3.98413E−01 | 8.82208E−01 | 3.81649E−01 | 1.22083E−01 | 2.59415E−02 |
| A14 = | −9.01807E−03 | −2.94656E−02 | −4.06860E−01 | −1.33304E−01 | | |

| Surface # | 8 | 9 | 10 | 11 | 12 | 13 |
|---|---|---|---|---|---|---|
| k = | 2.42955E+01 | 8.91139E+00 | −2.00000E+01 | −4.29397E+00 | −1.00000E+00 | −4.48402E+00 |
| A4 = | 7.32737E−02 | −4.41321E−02 | −2.84601E−02 | −8.90875E−02 | −9.24840E−02 | −9.02062E−02 |
| A6 = | 4.39140E−02 | 6.01185E−03 | 8.91708E−03 | 1.44312E−01 | −3.52599E−02 | 3.33096E−02 |
| A8 = | −2.29923E−01 | 1.36926E−02 | −9.97159E−03 | −1.21023E−01 | 3.07522E−02 | −1.09395E−02 |
| A10 = | 3.04355E−01 | 3.21945E−03 | −1.34409E−04 | 6.64974E−02 | −6.78038E−03 | 2.23692E−03 |
| A12 = | −1.68486E−01 | −3.36698E−03 | 2.58371E−03 | −1.69713E−02 | −1.56356E−03 | −2.72734E−04 |
| A14 = | 3.62944E−02 | | | 2.63892E−03 | 7.36725E−04 | 1.29863E−05 |

The equation of the aspheric surface profiles of the second embodiment has the same form as that of the first embodiment. Moreover, the definitions of the parameters of the relations are the same as those set forth in the first embodiment, but the values of the relations of the second embodiment are listed in TABLE 5 below:

TABLE 5

(Embodiment 2)

| f | 2.91 | R12/f | 0.19 |
|---|---|---|---|
| Fno | 2.60 | $|f1/f3|$ | 0.09 |
| HFOV | 37.0 | $(|f/f3| + |f/f4|)/(|f/f5| + |f/f6|)$ | 0.04 |
| V1 − V2 | 34.5 | SD/TD | 1.02 |
| T1/T56 | 1.26 | Yc/ImgH | 0.64 |
| ΣCT/Td | 0.78 | TTL/ImgH | 2.00 |
| R2/|R1| | −0.04 | | |

Embodiment 3

Figure 3A:
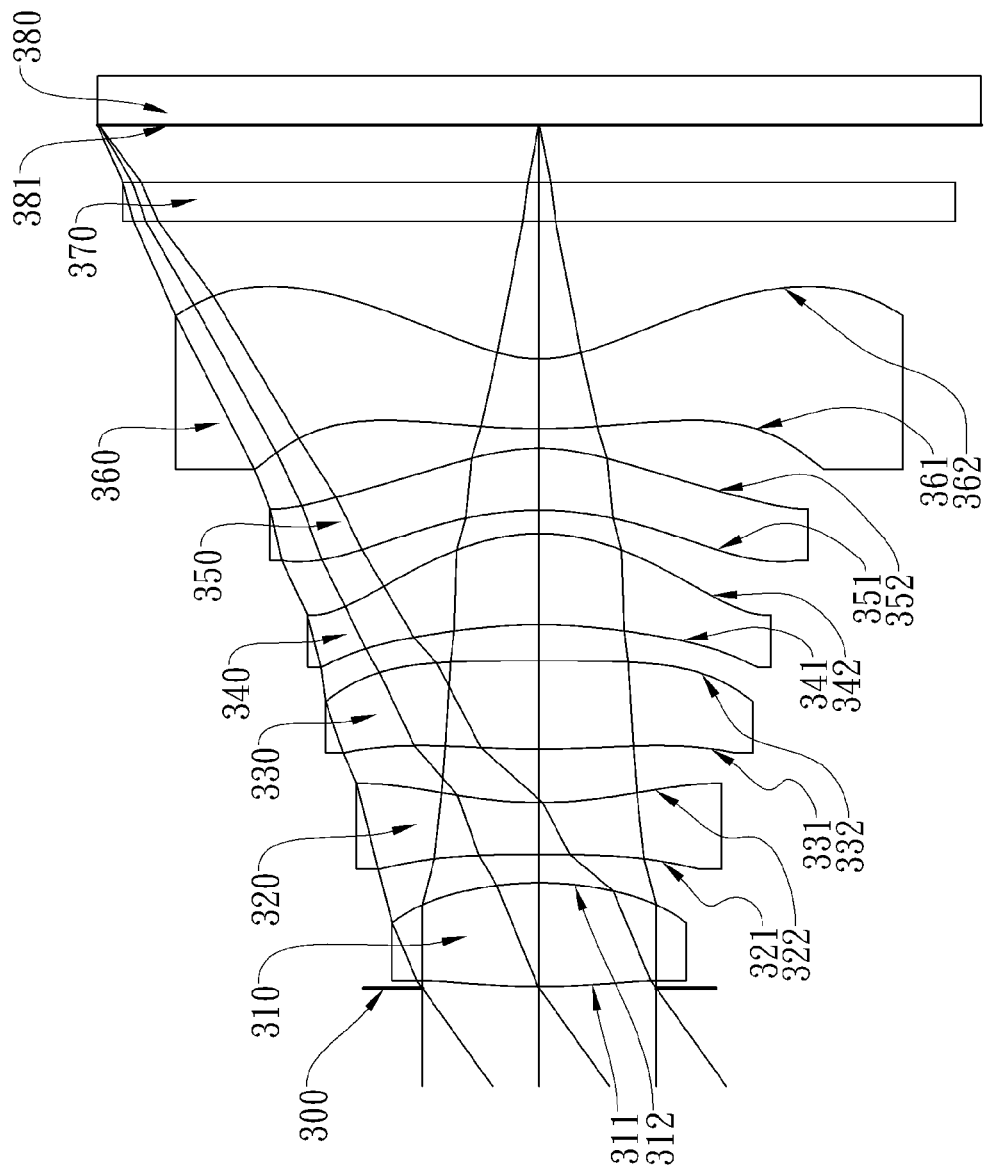
FIG. 3A shows an optical image capturing lens assembly in accordance with a third embodiment of the present disclosure.
Figure 3B:
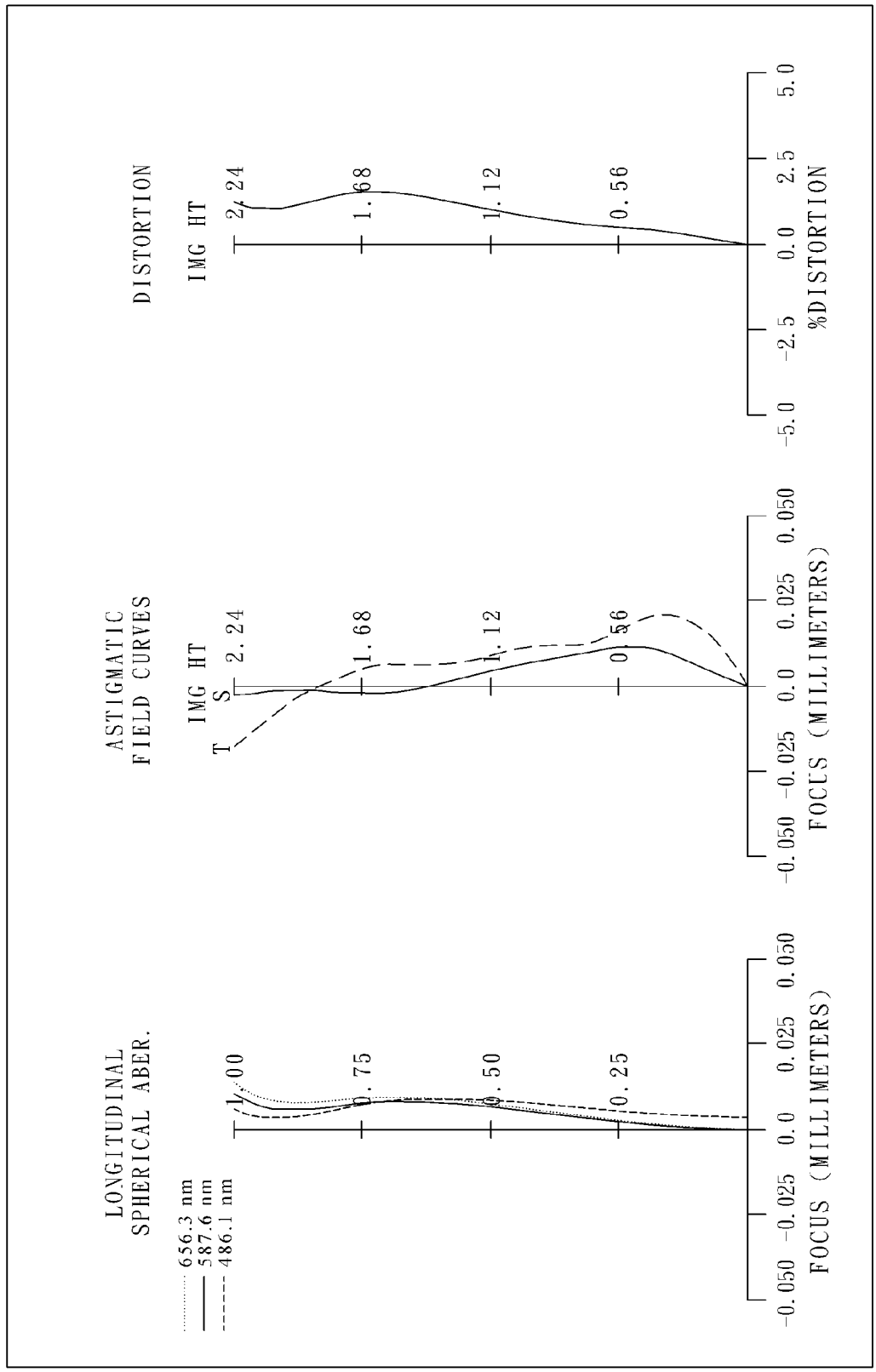
FIG. 3B shows the aberration curves of the third embodiment of the present disclosure.

FIG. 3A shows an optical image capturing lens assembly in accordance with a third embodiment of the present disclosure, and FIG. 3B shows the aberration curves of the third embodiment of the present disclosure. In the third embodiment of the present disclosure, there is an optical image capturing lens assembly mainly comprising six lens elements, in order from an object side to an image side:

a plastic first lens element 310 with positive refractive power having a convex object-side surface 311 and a convex image-side surface 312, the object-side surface 311 and the image-side surface 312 thereof being aspheric;

a plastic second lens element 320 with negative refractive power having a concave object-side surface 321 and a concave image-side surface 322, the object-side surface 321 and the image-side surface 322 thereof being aspheric;

a plastic third lens element 330 with positive refractive power having a convex object-side surface 331 and a convex image-side surface 332, the object-side surface 331 and the image-side surface 332 thereof being aspheric;

a plastic fourth lens element 340 with positive refractive power having a concave object-side surface 341 and a convex image-side surface 342, the object-side surface 341 and the image-side surface 342 thereof being aspheric;

a plastic fifth lens element 350 with positive refractive power having a concave object-side surface 351 and a convex image-side surface 352, the object-side surface 351 and the image-side surface 352 thereof being aspheric; and a plastic sixth lens element 360 with negative refractive power having a convex object-side surface 361 and a concave image-side surface 362 on which at least one inflection point is formed, the object-side surface 361 and the image-side surface 362 thereof being aspheric.

The optical image capturing lens assembly is also provided with a stop 300 disposed between an imaged object and the first lens element 310.

The optical image capturing lens assembly further comprises an IR-filter 370 disposed between the image-side surface 362 of the sixth lens element 360 and an image plane 381; the IR-filter 370 is made of glass and has no influence on the focal length of the optical image capturing lens assembly. Moreover, an image sensor 380 is disposed on the image plane 381.

The detailed optical data of the third embodiment is shown in TABLE 6, and the aspheric surface data is shown in TABLE 7, wherein the units of the radius of curvature, the thickness and the focal length are expressed in mm, and HFOV is half of the maximal field of view.

TABLE 6

(Embodiment 3)
f = 3.09 mm, Fno = 2.60, HFOV = 35.5 deg.

| Surface # | | Radius of Curvature | Thickness | Material | Refractive Index | Abbe # | Focal Length |
|---|---|---|---|---|---|---|---|
| 0 | Imaged Object | Plano | Infinity | | | | |
| 1 | Stop | Plano | 0.008 | | | | |
| 2 | Lens 1 | 3.561500 (ASP) | 0.528 | Plastic | 1.535 | 56.3 | 2.30 |
| 3 | | −1.780740 (ASP) | 0.145 | | | | |
| 4 | Lens 2 | −9.755100 (ASP) | 0.265 | Plastic | 1.614 | 25.6 | −2.67 |
| 5 | | 1.987590 (ASP) | 0.271 | | | | |
| 6 | Lens 3 | 4.672500 (ASP) | 0.451 | Plastic | 1.543 | 56.5 | 7.89 |
| 7 | | −50.000000 (ASP) | 0.184 | | | | |
| 8 | Lens 4 | −2.671880 (ASP) | 0.464 | Plastic | 1.535 | 56.3 | 2.84 |
| 9 | | −1.026210 (ASP) | 0.120 | | | | |
| 10 | Lens 5 | −1.666670 (ASP) | 0.315 | Plastic | 1.535 | 56.3 | 3.88 |
| 11 | | −0.984930 (ASP) | 0.100 | | | | |
| 12 | Lens 6 | 3.465400 (ASP) | 0.356 | Plastic | 1.530 | 55.8 | −1.59 |
| 13 | | 0.653960 (ASP) | 0.700 | | | | |
| 14 | IR-filter | Plano | 0.200 | Glass | 1.517 | 64.2 | — |
| 15 | | Plano | 0.291 | | | | |
| 16 | Image Plane | Plano | — | | | | |

* Reference Wavelength is d-line 587.6 nm

TABLE 7

Aspheric Coefficients

| Surface # | 2 | 3 | 4 | 5 | 6 | 7 |
|---|---|---|---|---|---|---|
| k = | −5.60011E+01 | −7.96121E+00 | −1.08533E+01 | −1.27363E+01 | −2.00000E+01 | −2.00000E+01 |
| A4 = | 5.46385E−02 | −1.40357E−01 | −5.75325E−02 | −3.89238E−02 | −1.45157E−01 | −7.15297E−02 |

TABLE 7-continued

Aspheric Coefficients

| | | | | | | |
|---|---|---|---|---|---|---|
| A6 = | −3.90708E−01 | −2.03447E−01 | −1.95696E−01 | −6.77109E−02 | −3.87234E−02 | −1.11829E−01 |
| A8 = | 2.75977E−02 | 1.66079E−02 | 3.54905E−01 | 1.50826E−01 | 2.58615E−01 | 1.01154E−01 |
| A10 = | −3.21164E−01 | 1.90775E−01 | −6.62505E−01 | −3.53117E−01 | −3.08858E−01 | −8.48646E−02 |
| A12 = | −2.33837E−01 | −2.60410E−01 | 1.10309E+00 | 3.61668E−01 | 1.24996E−01 | 3.22418E−02 |
| A14 = | −8.68706E−02 | −6.89493E−02 | −6.40337E−01 | −1.21687E−01 | | |

| Surface # | 8 | 9 | 10 | 11 | 12 | 13 |
|---|---|---|---|---|---|---|
| k = | −4.15719E+00 | −1.03020E+00 | −8.26626E−01 | −7.85259E+00 | −1.00000E+00 | −4.38545E+00 |
| A4 = | 7.04374E−02 | 7.78134E−02 | 4.66870E−02 | −1.15143E−02 | −1.31216E−01 | −9.75667E−02 |
| A6 = | 1.51446E−02 | 1.14674E−02 | 2.94266E−02 | 1.08604E−01 | 1.13732E−02 | 3.99090E−02 |
| A8 = | −2.37499E−01 | 1.21265E−02 | 9.03157E−04 | −1.23704E−01 | 8.73584E−03 | −1.39891E−02 |
| A10 = | 2.85284E−01 | 7.77611E−03 | −1.32220E−03 | 6.53060E−02 | −8.79566E−03 | 2.37177E−03 |
| A12 = | −1.74611E−01 | −1.46258E−03 | −6.22409E−05 | −1.74295E−02 | −5.67582E−04 | −2.06385E−04 |
| A14 = | 4.68735E−02 | | | 2.30530E−03 | 1.10697E−03 | 1.27977E−05 |

The equation of the aspheric surface profiles of the third embodiment has the same form as that of the first embodiment. Moreover, the definitions of the parameters of the relations are the same as those set forth in the first embodiment, but the values of the relations of the third embodiment are listed in TABLE 8 below:

TABLE 8

(Embodiment 3)

| f | 3.09 | R12/f | 0.21 |
|---|---|---|---|
| Fno | 2.60 | |f1/f3| | 0.29 |
| HFOV | 35.5 | (|f/f3| + |f/f4|)/(|f/f5| + |f/f6|) | 0.54 |
| V1 − V2 | 30.7 | SD/TD | 1.00 |
| T1/T56 | 1.45 | Yc/ImgH | 0.61 |
| ΣCT/Td | 0.74 | TTL/ImgH | 1.93 |
| R2/|R1| | −0.50 | | |

Embodiment 4

Figure 4A:
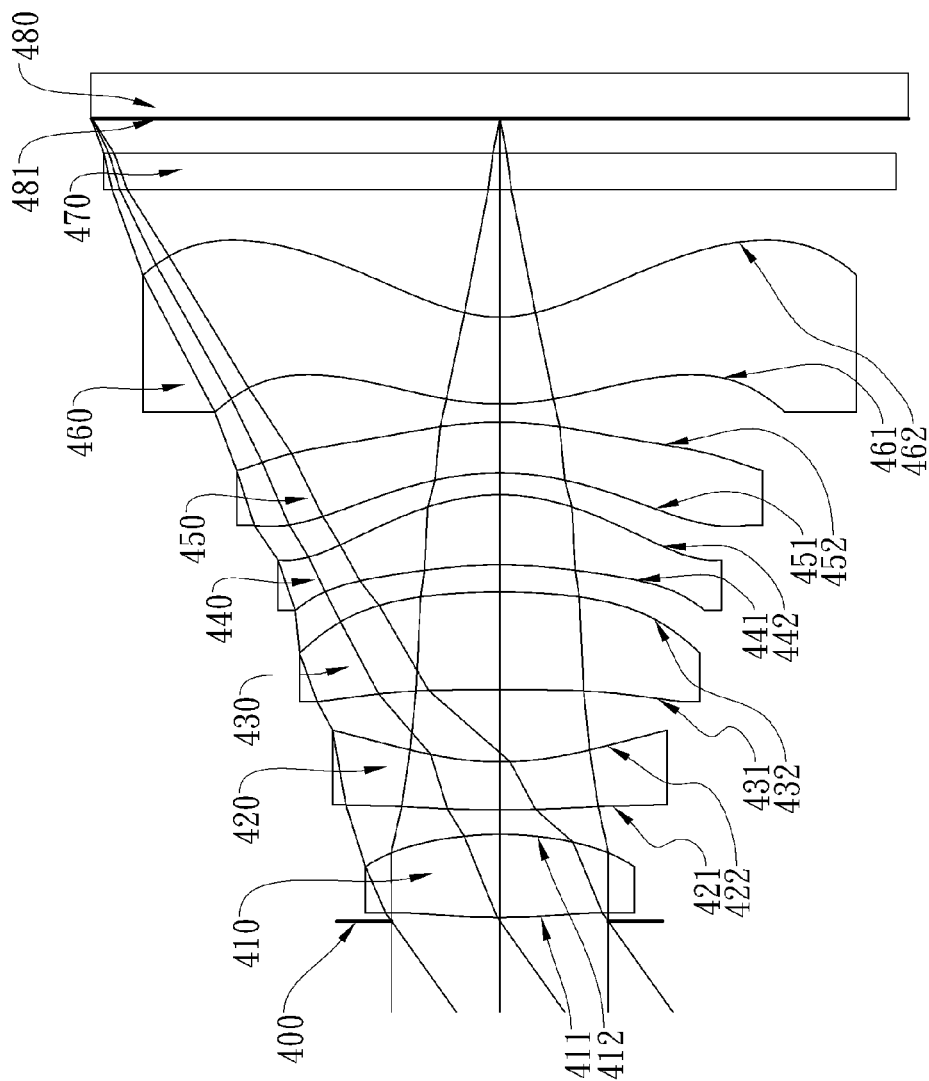
FIG. 4A shows an optical image capturing lens assembly in accordance with a fourth embodiment of the present disclosure.
Figure 4B:
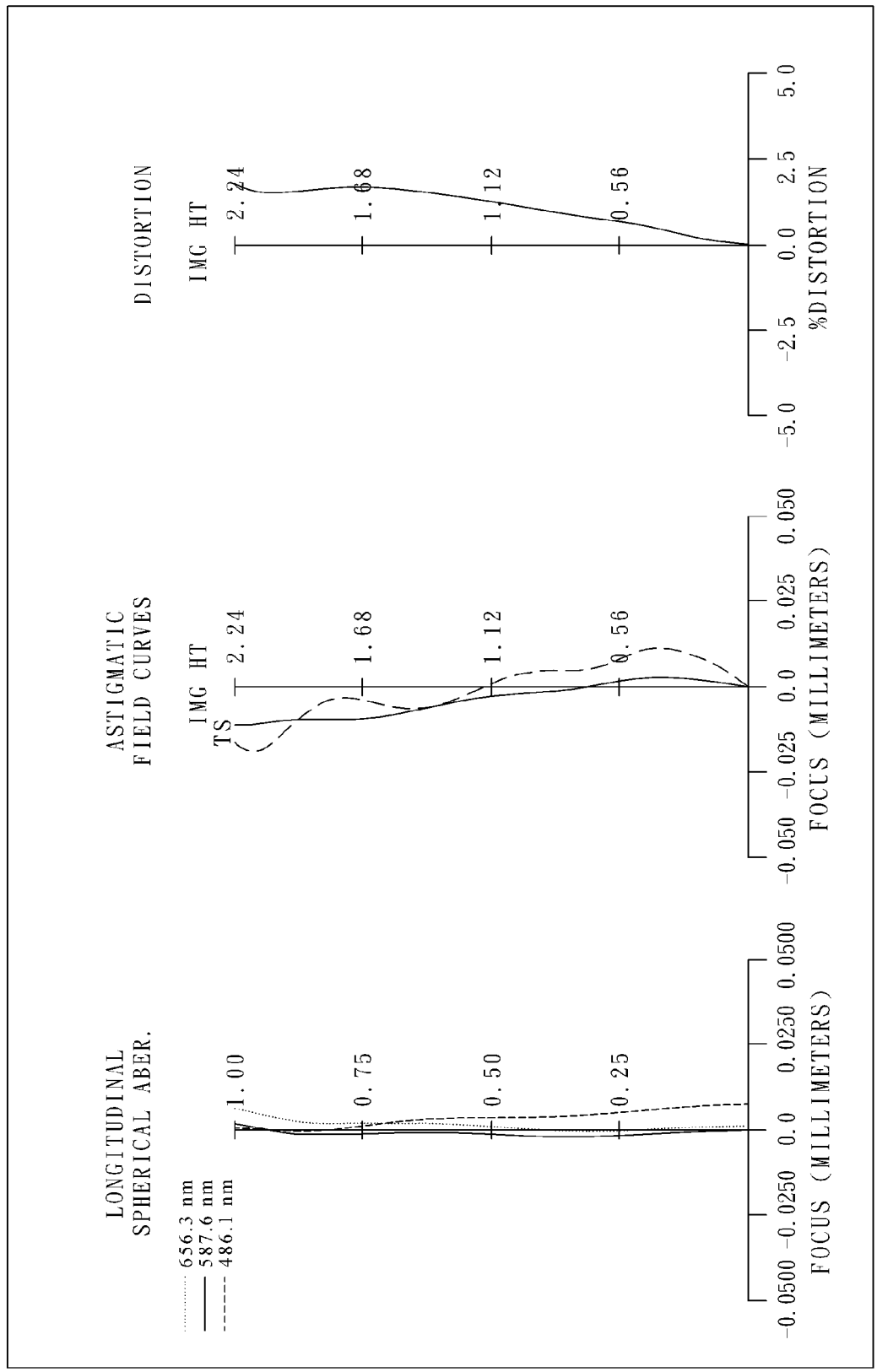
FIG. 4B shows the aberration curves of the fourth embodiment of the present disclosure.

FIG. 4A shows an optical image capturing lens assembly in accordance with a fourth embodiment of the present disclosure, and FIG. 4B shows the aberration curves of the fourth embodiment of the present disclosure. In the fourth embodiment of the present disclosure, there is an optical image capturing lens assembly mainly comprising six lens elements, in order from an object side to an image side:

a plastic first lens element 410 with positive refractive power having a convex object-side surface 411 and a convex image-side surface 412, the object-side surface 411 and the image-side surface 412 thereof being aspheric;

a plastic second lens element 420 with negative refractive power having a convex object-side surface 421 and a concave image-side surface 422, the object-side surface 421 and the image-side surface 422 thereof being aspheric;

a plastic third lens element 430 with positive refractive power having a concave object-side surface 431 and a convex image-side surface 432, the object-side surface 431 and the image-side surface 432 thereof being aspheric;

a plastic fourth lens element 440 with positive refractive power having a concave object-side surface 441 and a convex image-side surface 442, the object-side surface 441 and the image-side surface 442 thereof being aspheric;

a plastic fifth lens element 450 with negative refractive power having a concave object-side surface 451 and a convex image-side surface 452, the object-side surface 451 and the image-side surface 452 thereof being aspheric; and a plastic sixth lens element 460 with negative refractive power having a convex object-side surface 461 and a concave image-side surface 462 on which at least one inflection point is formed, the object-side surface 461 and the image-side surface 462 thereof being aspheric.

The optical image capturing lens assembly is also provided with a stop 400 disposed between an imaged object and the first lens element 410.

The optical image capturing lens assembly further comprises an IR-filter 470 disposed between the image-side surface 462 of the sixth lens element 460 and an image plane 481; the IR-filter 470 is made of glass and has no influence on the focal length of the optical image capturing lens assembly. Moreover, an image sensor 480 is disposed on the image plane 481.

The detailed optical data of the fourth embodiment is shown in TABLE 9, and the aspheric surface data is shown in TABLE 10, wherein the units of the radius of curvature, the thickness and the focal length are expressed in mm, and HFOV is half of the maximal field of view.

TABLE 9

(Embodiment 4)
f = 3.09 mm, Fno = 2.60, HFOV = 35.4 deg.

| Surface # | | Radius of Curvature | Thickness | Material | Refractive Index | Abbe # | Focal Length |
|---|---|---|---|---|---|---|---|
| 0 | Imaged Object | Plano | Infinity | | | | |
| 1 | Stop | Plano | 0.021 | | | | |
| 2 | Lens 1 | 3.884400 (ASP) | 0.456 | Plastic | 1.535 | 56.3 | 2.49 |
| 3 | | −1.942200 (ASP) | 0.134 | | | | |
| 4 | Lens 2 | 5.811300 (ASP) | 0.265 | Plastic | 1.650 | 21.4 | −3.54 |
| 5 | | 1.619170 (ASP) | 0.396 | | | | |
| 6 | Lens 3 | −109.682500 (ASP) | 0.539 | Plastic | 1.535 | 56.3 | 7.38 |

TABLE 9-continued (Embodiment 4)
f = 3.09 mm, Fno = 2.60, HFOV = 35.4 deg.

| Surface # | | Radius of Curvature | Thickness | Material | Refractive Index | Abbe # | Focal Length |
|---|---|---|---|---|---|---|---|
| 7 | | −3.816300 (ASP) | 0.150 | | | | |
| 8 | Lens 4 | −2.298820 (ASP) | 0.384 | Plastic | 1.535 | 56.3 | 3.73 |
| 9 | | −1.129430 (ASP) | 0.120 | | | | |
| 10 | Lens 5 | −1.591850 (ASP) | 0.280 | Plastic | 1.530 | 55.8 | −34.62 |
| 11 | | −1.849310 (ASP) | 0.100 | | | | |
| 12 | Lens 6 | 1.494320 (ASP) | 0.478 | Plastic | 1.530 | 55.8 | −3.88 |
| 13 | | 0.769450 (ASP) | 0.700 | | | | |
| 14 | IR-filter | Plano | 0.200 | Glass | 1.517 | 64.2 | — |
| 15 | | Plano | 0.191 | | | | |
| 16 | Image Plane | Plano | — | | | | |

* Reference Wavelength is d-line 587.6 nm

TABLE 10

Aspheric Coefficients

| Surface # | 2 | 3 | 4 | 5 | 6 | 7 |
|---|---|---|---|---|---|---|
| k = | −2.00000E+01 | −1.09750E+01 | 3.00000E+00 | −8.31888E+00 | 3.00000E+00 | −4.61144E+00 |
| A4 = | −6.11440E−02 | −1.47262E−01 | −5.02689E−02 | 2.21456E−02 | −1.29568E−01 | −5.60900E−02 |
| A6 = | −1.81835E−01 | −1.49279E−01 | −1.37441E−01 | −8.53743E−02 | −1.28011E−02 | −1.19069E−01 |
| A8 = | 1.15774E−01 | 2.47893E−02 | 3.66561E−01 | 1.56738E−01 | 2.72663E−01 | 9.21150E−02 |
| A10 = | −5.68531E−01 | 4.63826E−02 | −7.67419E−01 | −3.29701E−01 | −3.10029E−01 | −7.74412E−02 |
| A12 = | 3.69395E−01 | −1.87289E−01 | 1.02656E+00 | 3.51493E−01 | 1.20615E−01 | 3.43378E−02 |
| A14 = | −8.68706E−02 | 4.59846E−02 | −5.07837E−01 | −1.28533E−01 | | |

| Surface # | 8 | 9 | 10 | 11 | 12 | 13 |
|---|---|---|---|---|---|---|
| k = | −2.00000E+01 | −1.24742E+00 | −7.94805E−01 | −1.50534E+01 | −1.00000E+00 | −3.09699E+00 |
| A4 = | 4.67698E−02 | 8.36925E−02 | 4.43272E−02 | 5.22559E−03 | −2.20772E−01 | −1.13849E−01 |
| A6 = | 8.72886E−03 | −1.16014E−02 | 2.99618E−02 | 9.60853E−02 | 4.36909E−02 | 4.37944E−02 |
| A8 = | −2.33486E−01 | 2.09376E−02 | 2.24467E−04 | −1.26445E−01 | 8.89819E−03 | −1.22963E−02 |
| A10 = | 2.81228E−01 | 1.01303E−02 | −9.24605E−04 | 6.41841E−02 | −7.61184E−03 | 1.82717E−03 |
| A12 = | −1.80180E−01 | −5.90154E−03 | −1.45590E−04 | −1.74858E−02 | −5.97696E−04 | −2.08042E−04 |
| A14 = | 4.71001E−02 | | | 2.41138E−03 | 5.64390E−04 | 1.70313E−05 |

The equation of the aspheric surface profiles of the fourth embodiment has the same form as that of the first embodiment. Moreover, the definitions of the parameters of the relations are the same as those set forth in the first embodiment, but the values of the relations of the fourth embodiment are listed in TABLE 11 below:

TABLE 11

(Embodiment 4)

| f | 3.09 | R12/f | 0.25 |
|---|---|---|---|
| Fno | 2.60 | |f1/f3| | 0.34 |
| HFOV | 35.4 | (|f/f3| + |f/f4|)/(|f/f5| + |f/f6|) | 1.41 |
| V1 − V2 | 34.9 | SD/TD | 1.01 |
| T1/T56 | 1.34 | Yc/ImgH | 0.65 |
| ΣCT/Td | 0.73 | TTL/ImgH | 1.93 |
| R2/|R1| | −0.50 | | |

Embodiment 5

Figure 5A:
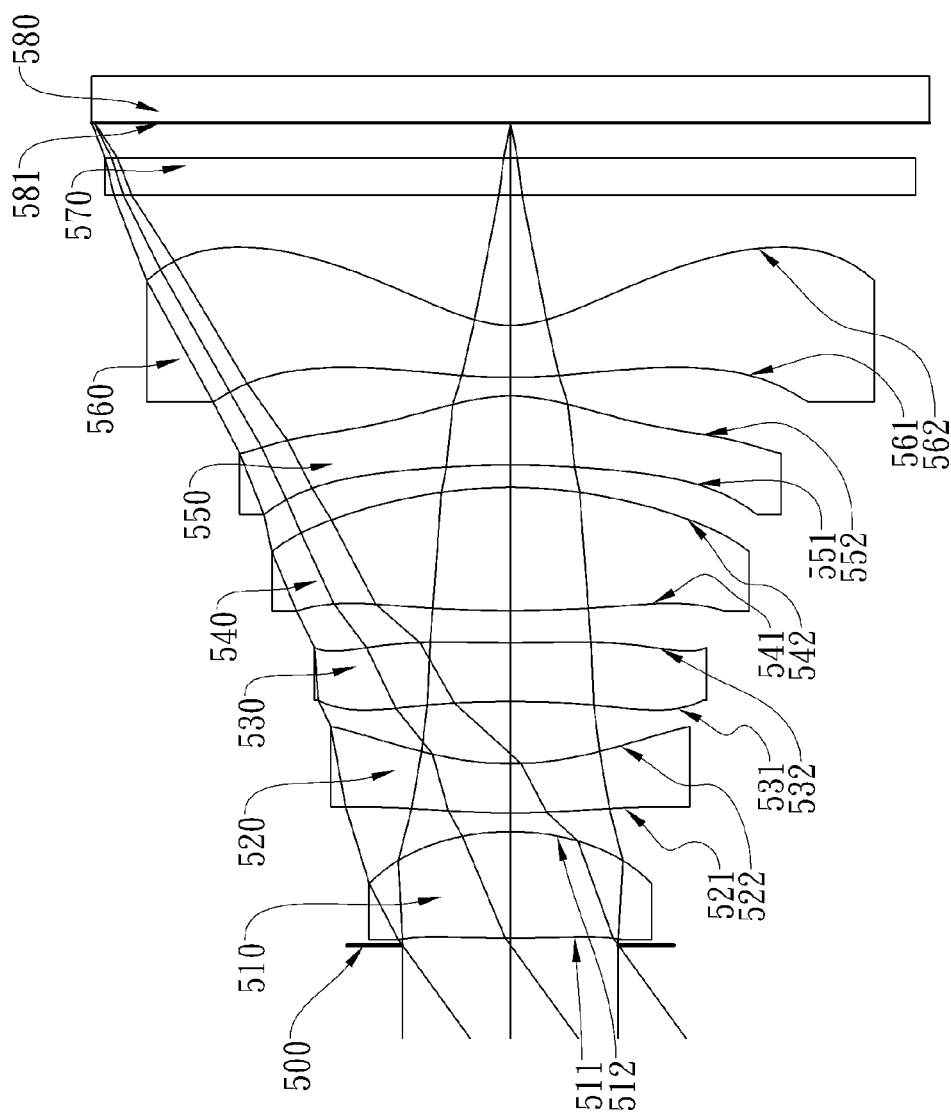
FIG. 5A shows an optical image capturing lens assembly in accordance with a fifth embodiment of the present disclosure.
Figure 5B:
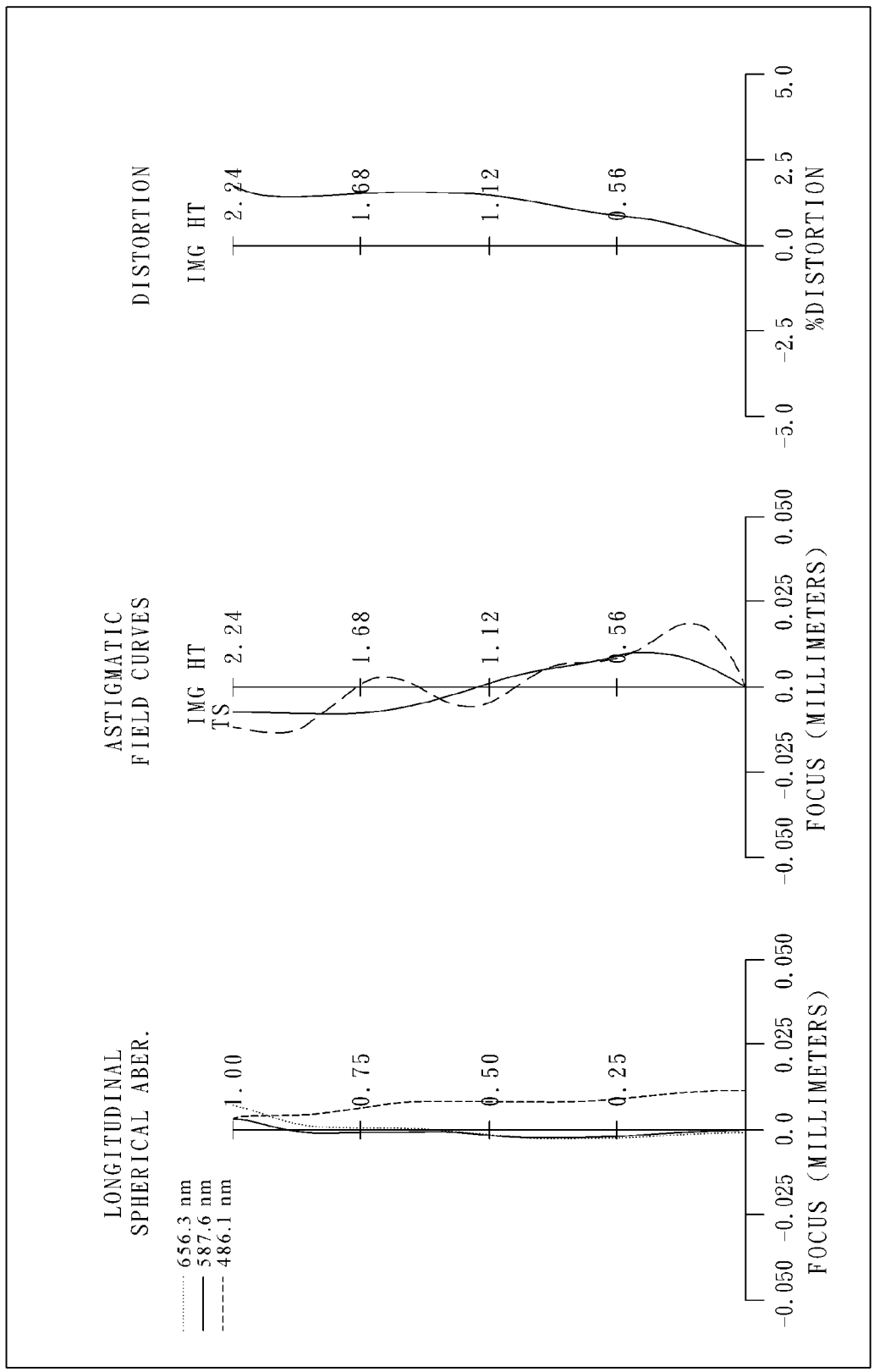
FIG. 5B shows the aberration curves of the fifth embodiment of the present disclosure.

FIG. 5A shows an optical image capturing lens assembly in accordance with a fifth embodiment of the present disclosure, and FIG. 5B shows the aberration curves of the fifth embodiment of the present disclosure. In the fifth embodiment of the present disclosure, there is an optical image capturing lens assembly mainly comprising six lens elements, in order from an object side to an image side:

a plastic first lens element 510 with positive refractive power having a convex object-side surface 511 and a convex image-side surface 512, the object-side surface 511 and the image-side surface 512 thereof being aspheric;

a plastic second lens element 520 with negative refractive power having a convex object-side surface 521 and a concave image-side surface 522, the object-side surface 521 and the image-side surface 522 thereof being aspheric;

a plastic third lens element 530 with negative refractive power having a concave object-side surface 531 and a concave image-side surface 532, the object-side surface 531 and the image-side surface 532 thereof being aspheric;

a plastic fourth lens element 540 with positive refractive power having a convex object-side surface 541 and a convex image-side surface 542, the object-side surface 541 and the image-side surface 542 thereof being aspheric;

a plastic fifth lens element 550 with positive refractive power having a concave object-side surface 551 and a convex image-side surface 552, the object-side surface 551 and the image-side surface 552 thereof being aspheric; and a plastic sixth lens element 560 with negative refractive power having a convex object-side surface 561 and a concave image-side surface 562 on which at least one inflection point is formed, the object-side surface 561 and the image-side surface 562 thereof being aspheric.

The optical image capturing lens assembly is also provided with a stop 500 disposed between an imaged object and the first lens element 510.

The optical image capturing lens assembly further comprises an IR-filter 570 disposed between the image-side surface 562 of the sixth lens element 560 and an image plane 581; the IR-filter 570 is made of glass and has no influence on the focal length of the optical image capturing lens assembly. Moreover, an image sensor 580 is disposed on the image plane 581.

The detailed optical data of the fifth embodiment is shown in TABLE 12, and the aspheric surface data is shown in TABLE 13, wherein the units of the radius of curvature, the thickness and the focal length are expressed in mm, and HFOV is half of the maximal field of view.

TABLE 14

(Embodiment 5)

| f | 3.02 | R12/f | 0.19 |
|---|---|---|---|
| Fno | 2.60 | $\|f1/f3\|$ | 0.31 |
| HFOV | 36.1 | $(\|f/f3\| + \|f/f4\|)/(\|f/f5\| + \|f/f6\|)$ | 0.33 |
| V1 − V2 | 35.4 | SD/TD | 1.01 |
| T1/T56 | 1.00 | Yc/ImgH | 0.65 |
| ΣCT/Td | 0.75 | TTL/ImgH | 1.93 |
| R2/\|R1\| | −0.19 | | |

TABLE 12

(Embodiment 5)
f = 3.02 mm, Fno = 2.60, HFOV = 36.1 deg.

| Surface # | | Radius of Curvature | Thickness | Material | Refractive Index | Abbe # | Focal Length |
|---|---|---|---|---|---|---|---|
| 0 | Imaged Object | Plano | Infinity | | | | |
| 1 | Stop | Plano | 0.039 | | | | |
| 2 | Lens 1 | 6.862500 (ASP) | 0.574 | Plastic | 1.514 | 56.8 | 2.21 |
| 3 | | −1.319710 (ASP) | 0.100 | | | | |
| 4 | Lens 2 | 4.309700 (ASP) | 0.265 | Plastic | 1.650 | 21.4 | −3.76 |
| 5 | | 1.520150 (ASP) | 0.335 | | | | |
| 6 | Lens 3 | −6.376100 (ASP) | 0.316 | Plastic | 1.583 | 30.2 | −7.07 |
| 7 | | 11.882200 (ASP) | 0.174 | | | | |
| 8 | Lens 4 | 7.428500 (ASP) | 0.664 | Plastic | 1.544 | 55.9 | 3.54 |
| 9 | | −2.516550 (ASP) | 0.120 | | | | |
| 10 | Lens 5 | −5.697100 (ASP) | 0.373 | Plastic | 1.530 | 55.8 | 1.91 |
| 11 | | −0.879000 (ASP) | 0.100 | | | | |
| 12 | Lens 6 | 3.198500 (ASP) | 0.280 | Plastic | 1.544 | 55.9 | −1.34 |
| 13 | | 0.575330 (ASP) | 0.700 | | | | |
| 14 | IR-filter | Plano | 0.200 | Glass | 1.517 | 64.2 | — |
| 15 | | Plano | 0.191 | | | | |
| 16 | Image Plane | Plano | — | | | | |

\* Reference Wavelength is d-line 587.6 nm

TABLE 13

Aspheric Coefficients

| Surface # | 2 | 3 | 4 | 5 | 6 | 7 |
|---|---|---|---|---|---|---|
| k = | −2.00000E+01 | −4.57116E+00 | −2.00000E+01 | −6.87985E+00 | −1.53094E+01 | −2.00000E+01 |
| A4 = | −1.59425E−01 | −2.42321E−01 | −8.59161E−02 | 1.44314E−02 | −9.98192E−02 | −1.51147E−01 |
| A6 = | −2.14119E−01 | −8.94900E−02 | −9.10599E−02 | −7.40514E−02 | 5.54182E−02 | −3.67312E−02 |
| A8 = | 6.66167E−02 | 3.38885E−02 | 4.00208E−01 | 1.81699E−01 | 3.24501E−01 | 1.19753E−01 |
| A10 = | −5.86568E−01 | −1.23300E−01 | −8.24052E−01 | −3.38506E−01 | −2.94020E−01 | −5.37421E−02 |
| A12 = | 8.64640E−02 | 7.96735E−02 | 9.50218E−01 | 3.22213E−01 | 7.77454E−02 | 4.00632E−02 |
| A14 = | −8.68706E−02 | −2.04201E−01 | −4.25936E−01 | −1.27422E−01 | | |

| Surface # | 8 | 9 | 10 | 11 | 12 | 13 |
|---|---|---|---|---|---|---|
| k = | −1.37120E+01 | 8.61598E−02 | 3.00000E+00 | −7.91197E+00 | −1.00000E+00 | −4.02900E+00 |
| A4 = | 4.36029E−02 | 4.36213E−02 | 1.07644E−02 | 7.20492E−02 | −1.36287E−01 | −1.02700E−01 |
| A6 = | −4.61614E−02 | −3.50616E−02 | −1.41504E−02 | 7.85192E−02 | 2.80232E−02 | 4.12980E−02 |
| A8 = | −1.68430E−01 | 9.23950E−03 | −9.93786E−03 | −1.29113E−01 | 8.37914E−03 | −1.19706E−02 |
| A10 = | 2.79571E−01 | 5.59138E−03 | 7.58629E−04 | 6.47160E−02 | −5.58327E−03 | 1.76996E−03 |
| A12 = | −1.90913E−01 | −4.45314E−03 | 7.93272E−04 | −1.70894E−02 | −3.72498E−04 | −1.43329E−04 |
| A14 = | 4.97017E−02 | | | 2.31976E−03 | 3.46478E−04 | 3.81563E−06 |

The equation of the aspheric surface profiles of the fifth embodiment has the same form as that of the first embodiment. Moreover, the definitions of the parameters of the relations are the same as those set forth in the first embodiment, but the values of the relations of the fifth embodiment are listed in TABLE 14 below:

Embodiment 6

Figure 6A:
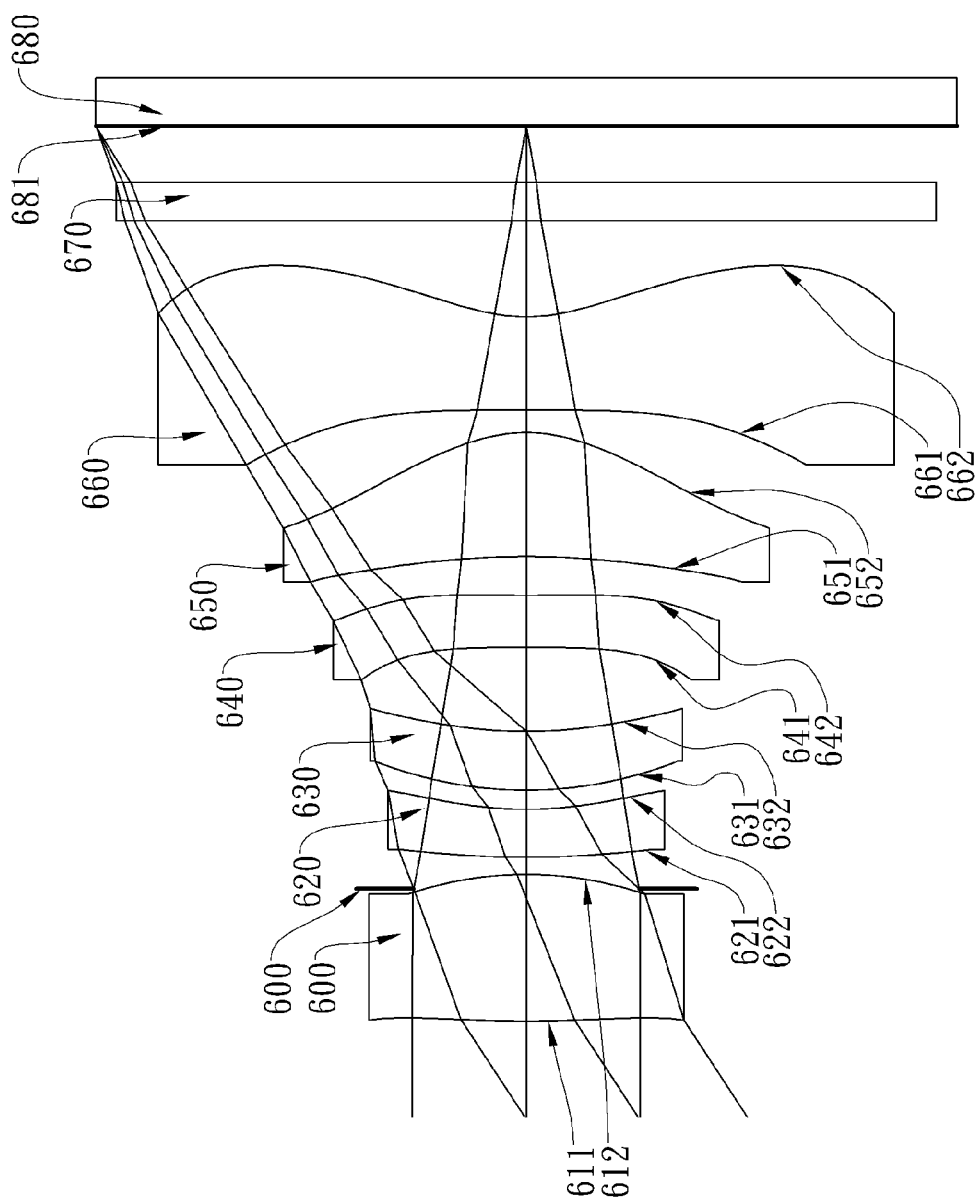
FIG. 6A shows an optical image capturing lens assembly in accordance with a sixth embodiment of the present disclosure.
Figure 6B:
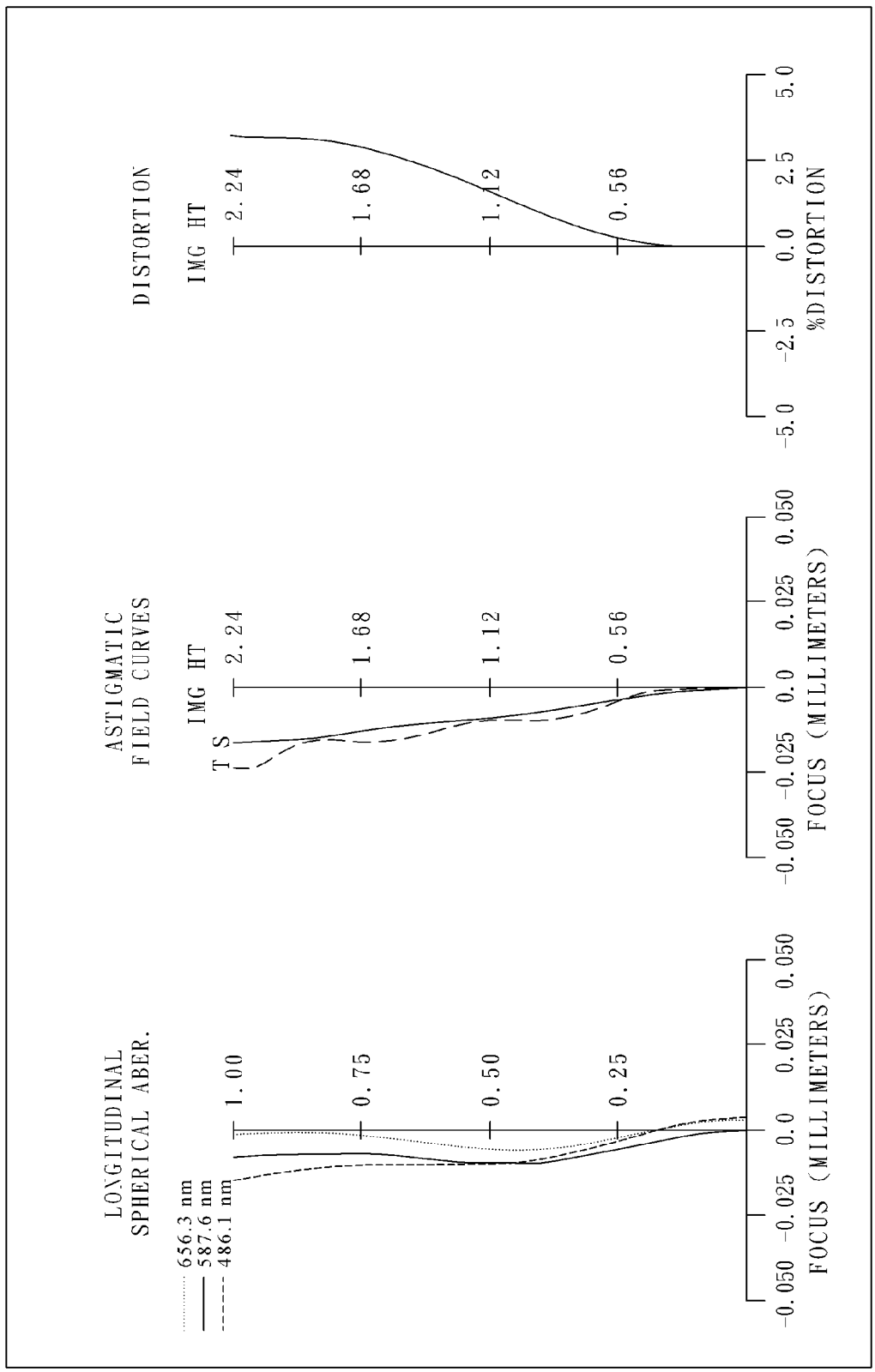
FIG. 6B shows the aberration curves of the sixth embodiment of the present disclosure.

FIG. 6A shows an optical image capturing lens assembly in accordance with a sixth embodiment of the present disclosure, and FIG. 6B shows the aberration curves of the sixth embodiment of the present disclosure. In the sixth embodiment of the present disclosure, there is an optical image capturing lens assembly mainly comprising six lens elements, in order from an object side to an image side:

a plastic first lens element 610 with positive refractive power having a convex object-side surface 611 and a convex image-side surface 612, the object-side surface 611 and the image-side surface 612 thereof being aspheric;

a plastic second lens element 620 with negative refractive power having a convex object-side surface 621 and a concave image-side surface 622, the object-side surface 621 and the image-side surface 622 thereof being aspheric;

a plastic third lens element 630 with positive refractive power having a convex object-side surface 631 and a concave image-side surface 632, the object-side surface 631 and the image-side surface 632 thereof being aspheric;

a plastic fourth lens element 640 with negative refractive power having a concave object-side surface 641 and a concave image-side surface 642, the object-side surface 641 and the image-side surface 642 thereof being aspheric;

a plastic fifth lens element 650 with positive refractive power having a concave object-side surface 651 and a convex image-side surface 652, the object-side surface 651 and the image-side surface 652 thereof being aspheric; and a plastic sixth lens element 660 with negative refractive power having a concave object-side surface 661 and a concave image-side surface 662 on which at least one inflection point is formed, the object-side surface 661 and the image-side surface 662 thereof being aspheric.

The optical image capturing lens assembly is also provided with a stop 600 disposed between the first lens element 610 and the second lens element 620.

The optical image capturing lens assembly further comprises an IR-filter 670 disposed between the image-side surface 662 of the sixth lens element 660 and an image plane 681; the IR-filter 670 is made of glass and has no influence on the focal length of the optical image capturing lens assembly. Moreover, an image sensor 680 is disposed on the image plane 681.

The detailed optical data of the sixth embodiment is shown in TABLE 15, and the aspheric surface data is shown in TABLE 16, wherein the units of the radius of curvature, the thickness and the focal length are expressed in mm, and HFOV is half of the maximal field of view.

TABLE 15

(Embodiment 6)
f = 3.32 mm, Fno = 2.80, HFOV = 33.2 deg.

| Surface # | | Radius of Curvature | | Thickness | Material | Refractive Index | Abbe # | Focal Length |
|---|---|---|---|---|---|---|---|---|
| 0 | Imaged Object | Plano | | Infinity | | | | |
| 1 | Lens 1 | 6.408700 | (ASP) | 0.764 | Plastic | 1.544 | 55.9 | 2.71 |
| 2 | | −1.831180 | (ASP) | −0.074 | | | | |
| 3 | Stop | Plano | | 0.163 | | | | |
| 4 | Lens 2 | 4.966500 | (ASP) | 0.250 | Plastic | 1.650 | 21.4 | −5.15 |
| 5 | | 1.959100 | (ASP) | 0.100 | | | | |
| 6 | Lens 3 | 2.063900 | (ASP) | 0.306 | Plastic | 1.544 | 55.9 | 22.05 |
| 7 | | 2.362330 | (ASP) | 0.437 | | | | |
| 8 | Lens 4 | −48.639800 | (ASP) | 0.271 | Plastic | 1.650 | 21.4 | −15.55 |
| 9 | | 12.778800 | (ASP) | 0.203 | | | | |
| 10 | Lens 5 | −4.097800 | (ASP) | 0.646 | Plastic | 1.544 | 55.9 | 1.67 |
| 11 | | −0.785230 | (ASP) | 0.117 | | | | |
| 12 | Lens 6 | −43.105500 | (ASP) | 0.486 | Plastic | 1.530 | 55.8 | −1.55 |
| 13 | | 0.843350 | (ASP) | 0.500 | | | | |
| 14 | IR-filter | Plano | | 0.200 | Glass | 1.517 | 64.2 | — |
| 15 | | Plano | | 0.293 | | | | |
| 16 | Image Plane | Plano | | — | | | | |

\* Reference Wavelength is d-line 587.6 nm

TABLE 16

Aspheric Coefficients

| Surface # | 1 | 2 | 4 | 5 | 6 | 7 |
|---|---|---|---|---|---|---|
| k = | −2.00000E+01 | −9.35072E+00 | −2.00000E+01 | −3.62741E+00 | −2.44943E+00 | −7.03668E+00 |
| A4 = | −6.02304E−02 | −8.86542E−02 | 7.09871E−02 | −4.71940E−02 | 1.04494E−02 | −1.66084E−02 |
| A6 = | −1.01947E−01 | −1.16243E−01 | −2.97448E−01 | −5.67199E−02 | 2.37164E−02 | 7.53568E−03 |
| A8 = | 2.11077E−01 | 1.97227E−01 | 5.19817E−01 | −1.19014E−01 | −7.95636E−02 | 8.24025E−02 |
| A10 = | −3.23391E−01 | −7.53916E−02 | −7.69377E−01 | 1.48320E−01 | 1.16708E−01 | −2.80714E−01 |
| A12 = | 1.85885E−01 | −8.08674E−02 | 8.27201E−01 | −3.56196E−08 | −3.79679E−08 | 3.71524E−01 |
| A14 = | −2.53315E−02 | 9.99021E−03 | −3.88300E−01 | | | −1.46766E−01 |

| Surface # | 8 | 9 | 10 | 11 | 12 | 13 |
|---|---|---|---|---|---|---|
| k = | −1.00000E+00 | −1.00000E+00 | 1.07102E+01 | −3.81664E+00 | −1.00000E+00 | −6.29453E+00 |
| A4 = | −2.68206E−01 | −2.08582E−01 | 5.03493E−02 | −1.08684E−01 | −5.99344E−02 | −8.93447E−02 |
| A6 = | −1.71626E−01 | −7.86278E−02 | 5.84413E−02 | 1.73512E−01 | −4.74963E−02 | 3.40980E−02 |
| A8 = | 3.66557E−01 | 1.46042E−01 | −2.14858E−01 | −1.24636E−01 | 4.20968E−02 | −1.25230E−02 |
| A10 = | −3.73879E−01 | −5.62338E−02 | 2.98697E−01 | 6.51349E−02 | −7.10379E−03 | 2.98857E−03 |

TABLE 16-continued

Aspheric Coefficients

| A12 = | 1.69579E−01 | 4.44843E−02 | −1.74881E−01 | −1.74623E−02 | −2.24900E−03 | −4.50979E−04 |
| A14 = | −7.71340E−05 | −1.62374E−02 | 3.80770E−02 | 7.79536E−04 | 6.26314E−04 | 2.55932E−05 |

The equation of the aspheric surface profiles of the sixth embodiment has the same form as that of the first embodiment. Moreover, the definitions of the parameters of the relations are the same as those set forth in the first embodiment, but the values of the relations of the sixth embodiment are listed in TABLE 17 below:

TABLE 17

(Embodiment 6)

| f | 3.32 | R12/f | 0.25 |
| Fno | 2.80 | |f1/f3| | 0.12 |
| HFOV | 33.2 | (|f/f3| + |f/f4|)/(|f/f5| + |f/f6|) | 0.09 |
| V1 − V2 | 34.5 | SD/TD | 0.81 |
| T1/T56 | 0.76 | Yc/ImgH | 0.58 |
| ΣCT/Td | 0.74 | TTL/ImgH | 2.05 |
| R2/|R1| | −0.29 | | |

Embodiment 7

Figure 7A:
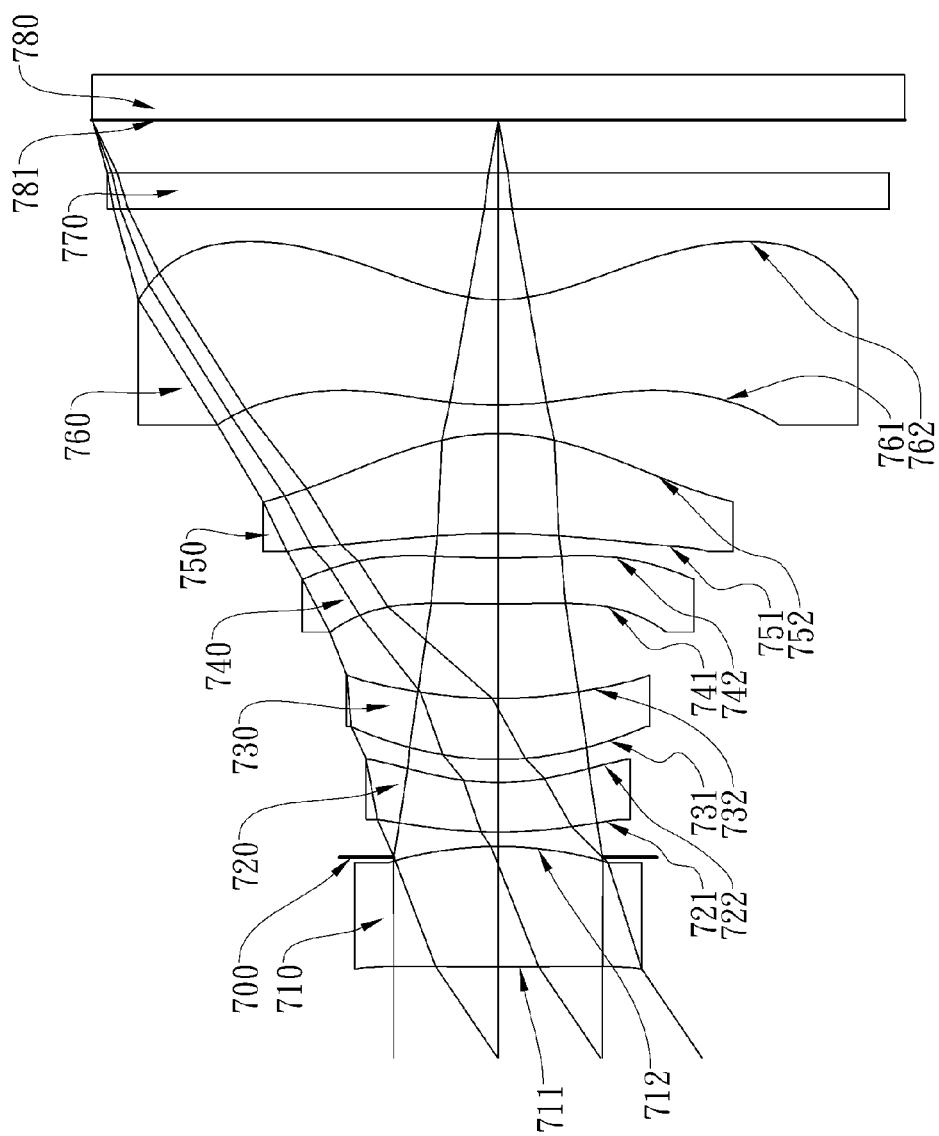
FIG. 7A shows an optical image capturing lens assembly in accordance with a seventh embodiment of the present disclosure.
Figure 7B:
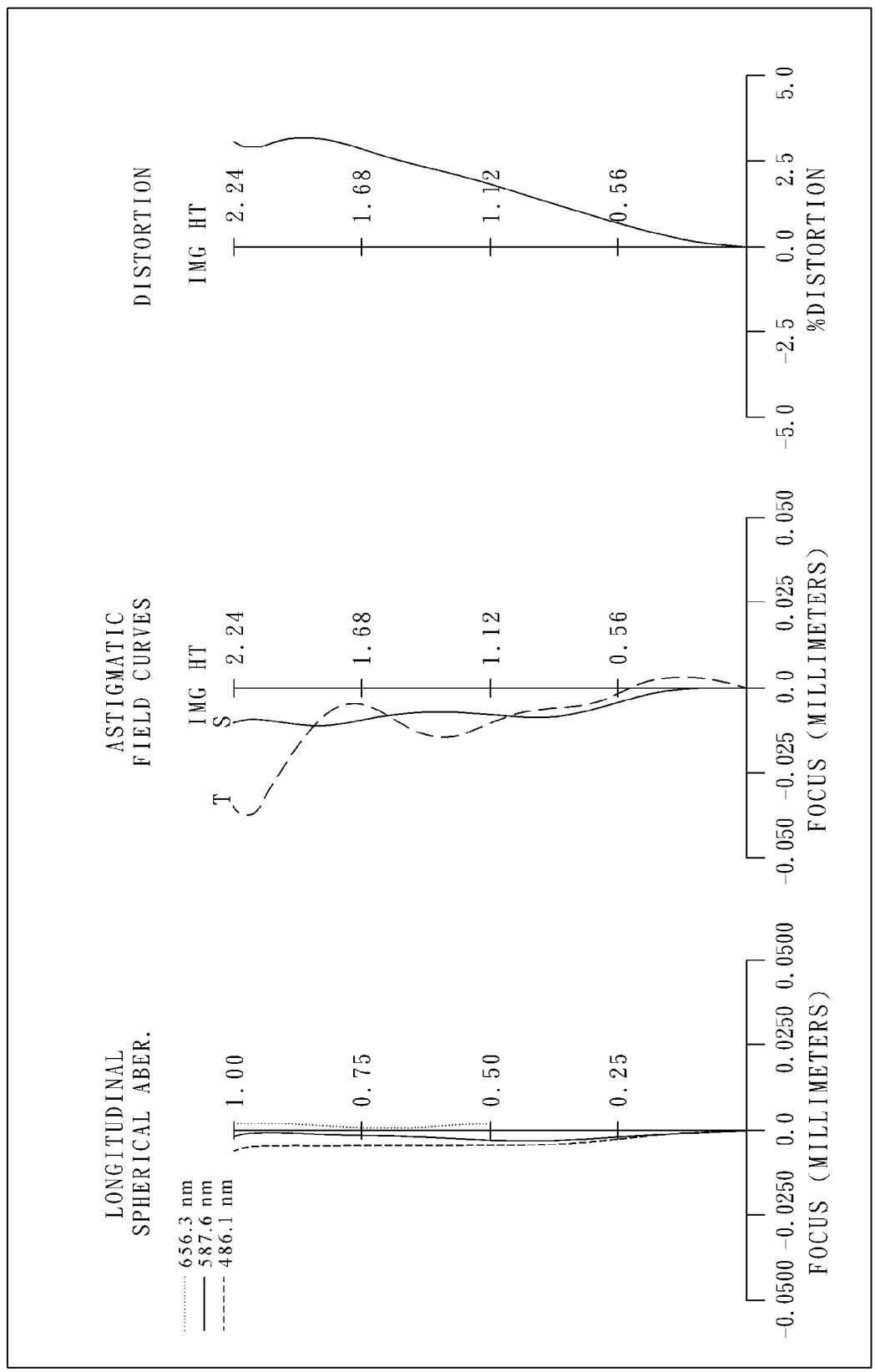
FIG. 7B shows the aberration curves of the seventh embodiment of the present disclosure.

FIG. 7A shows an optical image capturing lens assembly in accordance with a seventh embodiment of the present disclosure, and FIG. 7B shows the aberration curves of the seventh embodiment of the present disclosure. In the seventh embodiment of the present disclosure, there is an optical image capturing lens assembly mainly comprising six lens elements, in order from an object side to an image side:

a plastic first lens element 710 with positive refractive power having a convex object-side surface 711 and a convex image-side surface 712, the object-side surface 711 and the image-side surface 712 thereof being aspheric;

a plastic second lens element 720 with negative refractive power having a convex object-side surface 721 and a concave image-side surface 722, the object-side surface 721 and the image-side surface 722 thereof being aspheric;

a plastic third lens element 730 with positive refractive power having a convex object-side surface 731 and a concave image-side surface 732, the object-side surface 731 and the image-side surface 732 thereof being aspheric;

a plastic fourth lens element 740 with negative refractive power having a convex object-side surface 741 and a concave image-side surface 742, the object-side surface 741 and the image-side surface 742 thereof being aspheric;

a plastic fifth lens element 750 with positive refractive power having a concave object-side surface 751 and a convex image-side surface 752, the object-side surface 751 and the image-side surface 752 thereof being aspheric; and a plastic sixth lens element 760 with negative refractive power having a convex object-side surface 761 and a concave image-side surface 762 on which at least one inflection point is formed, the object-side surface 761 and the image-side surface 762 thereof being aspheric.

The optical image capturing lens assembly is also provided with a stop 700 disposed between the first lens element 710 and the second lens element 720.

The optical image capturing lens assembly further comprises an IR-filter 770 disposed between the image-side surface 762 of the sixth lens element 760 and an image plane 781; the IR-filter 770 is made of glass and has no influence on the focal length of the optical image capturing lens assembly. Moreover, an image sensor 780 is disposed on the image plane 781.

The detailed optical data of the seventh embodiment is shown in TABLE 18, and the aspheric surface data is shown in TABLE 19, wherein the units of the radius of curvature, the thickness and the focal length are expressed in mm, and HFOV is half of the maximal field of view.

TABLE 18

(Embodiment 7)
f = 3.22 mm, Fno = 2.80, HFOV = 34.0 deg.

| Surface # | | Radius of Curvature | Thickness | Material | Refractive Index | Abbe # | Focal Length |
|---|---|---|---|---|---|---|---|
| 0 | Imaged Object | Plano | Infinity | | | | |
| 1 | Lens 1 | 12.446500 (ASP) | 0.666 | Plastic | 1.544 | 55.9 | 3.41 |
| 2 | | −2.139630 (ASP) | −0.059 | | | | |
| 3 | Stop | Plano | 0.139 | | | | |
| 4 | Lens 2 | 2.511240 (ASP) | 0.274 | Plastic | 1.650 | 21.4 | −5.44 |
| 5 | | 1.405500 (ASP) | 0.127 | | | | |
| 6 | Lens 3 | 1.741180 (ASP) | 0.337 | Plastic | 1.544 | 55.9 | 9.26 |
| 7 | | 2.479600 (ASP) | 0.523 | | | | |
| 8 | Lens 4 | 9.632000 (ASP) | 0.253 | Plastic | 1.650 | 21.4 | −15.63 |
| 9 | | 4.892000 (ASP) | 0.135 | | | | |
| 10 | Lens 5 | −4.129500 (ASP) | 0.552 | Plastic | 1.544 | 55.9 | 3.13 |
| 11 | | −1.262850 (ASP) | 0.157 | | | | |
| 12 | Lens 6 | 2.127690 (ASP) | 0.582 | Plastic | 1.530 | 55.8 | −4.03 |
| 13 | | 0.965390 (ASP) | 0.500 | | | | |
| 14 | IR-filter | Plano | 0.200 | Glass | 1.517 | 64.2 | — |
| 15 | | Plano | 0.292 | | | | |
| 16 | Image Plane | Plano | — | | | | |

* Reference Wavelength is d-line 587.6 nm

TABLE 19

Aspheric Coefficients

| Surface # | 1 | 2 | 4 | 5 | 6 | 7 |
|---|---|---|---|---|---|---|
| k = | −1.21103E+01 | −9.04234E+00 | −1.79544E+01 | −3.72330E+00 | −2.74597E+00 | −6.97332E+00 |
| A4 = | −6.33181E−02 | −8.71325E−02 | 6.85660E−02 | −5.29481E−02 | 8.06553E−03 | −2.16351E−02 |
| A6 = | −7.79705E−02 | −9.19801E−02 | −2.99086E−01 | −7.70329E−02 | 3.36974E−02 | 1.19401E−03 |
| A8 = | 1.81985E−01 | 1.91144E−01 | 4.80566E−01 | −1.26853E−01 | −8.52789E−02 | 1.21889E−01 |
| A10 = | −3.02099E−01 | −1.17503E−01 | −7.79760E−01 | 9.38084E−02 | 8.39224E−02 | −2.59456E−01 |
| A12 = | 1.85885E−01 | −8.08675E−02 | 8.27201E−01 | −8.36767E−08 | −8.50732E−08 | 3.71524E−01 |
| A14 = | −2.53315E−02 | 9.99018E−03 | −3.88300E−01 | | | −1.46766E−01 |

| Surface # | 8 | 9 | 10 | 11 | 12 | 13 |
|---|---|---|---|---|---|---|
| k = | −1.00000E+00 | −1.00000E+00 | 1.03801E+01 | −5.19697E+00 | −1.00000E+00 | −3.32043E+00 |
| A4 = | −2.31628E−01 | −2.22188E−01 | 8.02620E−02 | −9.78860E−02 | −1.73380E−01 | −1.22729E−01 |
| A6 = | −2.02638E−01 | −6.15335E−02 | 5.45109E−02 | 1.65876E−01 | −1.97329E−02 | 4.35851E−02 |
| A8 = | 3.76184E−01 | 1.39469E−01 | −2.14931E−01 | −1.28327E−01 | 4.26406E−02 | −1.24999E−02 |
| A10 = | −3.71120E−01 | −6.40355E−02 | 2.97662E−01 | 6.50203E−02 | −8.26664E−03 | 2.68101E−03 |
| A12 = | 1.69579E−01 | 4.05419E−02 | −1.76555E−01 | −1.70090E−02 | −2.39561E−03 | −4.26678E−04 |
| A14 = | −7.71625E−05 | −2.04804E−02 | 3.86199E−02 | 1.18927E−03 | 6.51329E−04 | 2.36162E−05 |

The equation of the aspheric surface profiles of the seventh embodiment has the same form as that of the first embodiment. Moreover, the definitions of the parameters of the relations are the same as those set forth in the first embodiment, but the values of the relations of the seventh embodiment are listed in TABLE 20 below:

TABLE 20

(Embodiment 7)

| f | 3.22 | R12/f | 0.30 |
|---|---|---|---|
| Fno | 2.80 | |f1/f3| | 0.37 |
| HFOV | 34.0 | (|f/f3| + |f/f4|)/(|f/f5| + |f/f6|) | 0.30 |
| V1 − V2 | 34.5 | SD/TD | 0.84 |
| T1/T56 | 0.51 | Yc/ImgH | 0.61 |
| ΣCT/Td | 0.72 | TTL/ImgH | 2.06 |
| R2/|R1| | −0.17 | | |

Embodiment 8

Figure 8A:
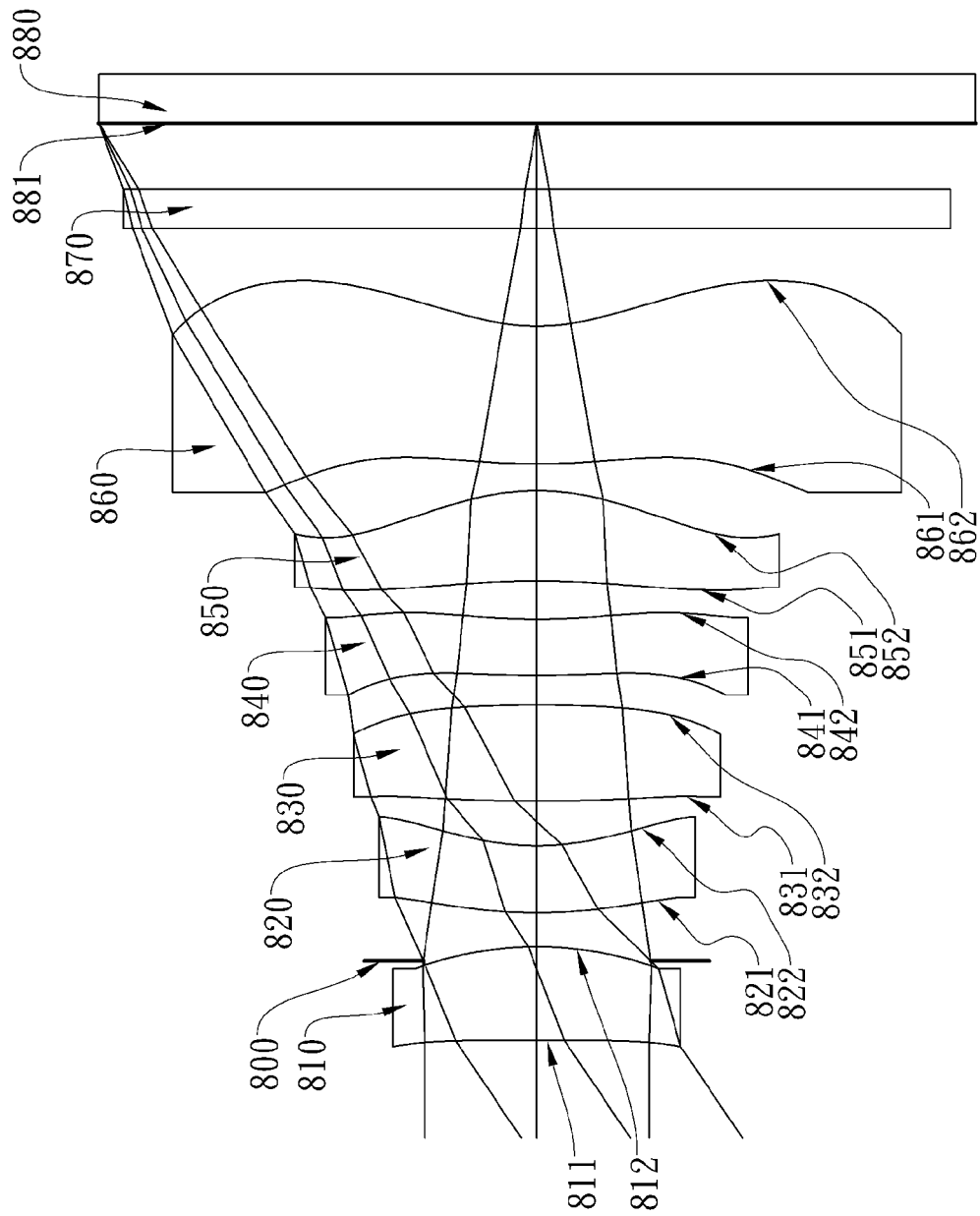
FIG. 8A shows an optical image capturing lens assembly in accordance with an eighth embodiment of the present disclosure.
Figure 8B:
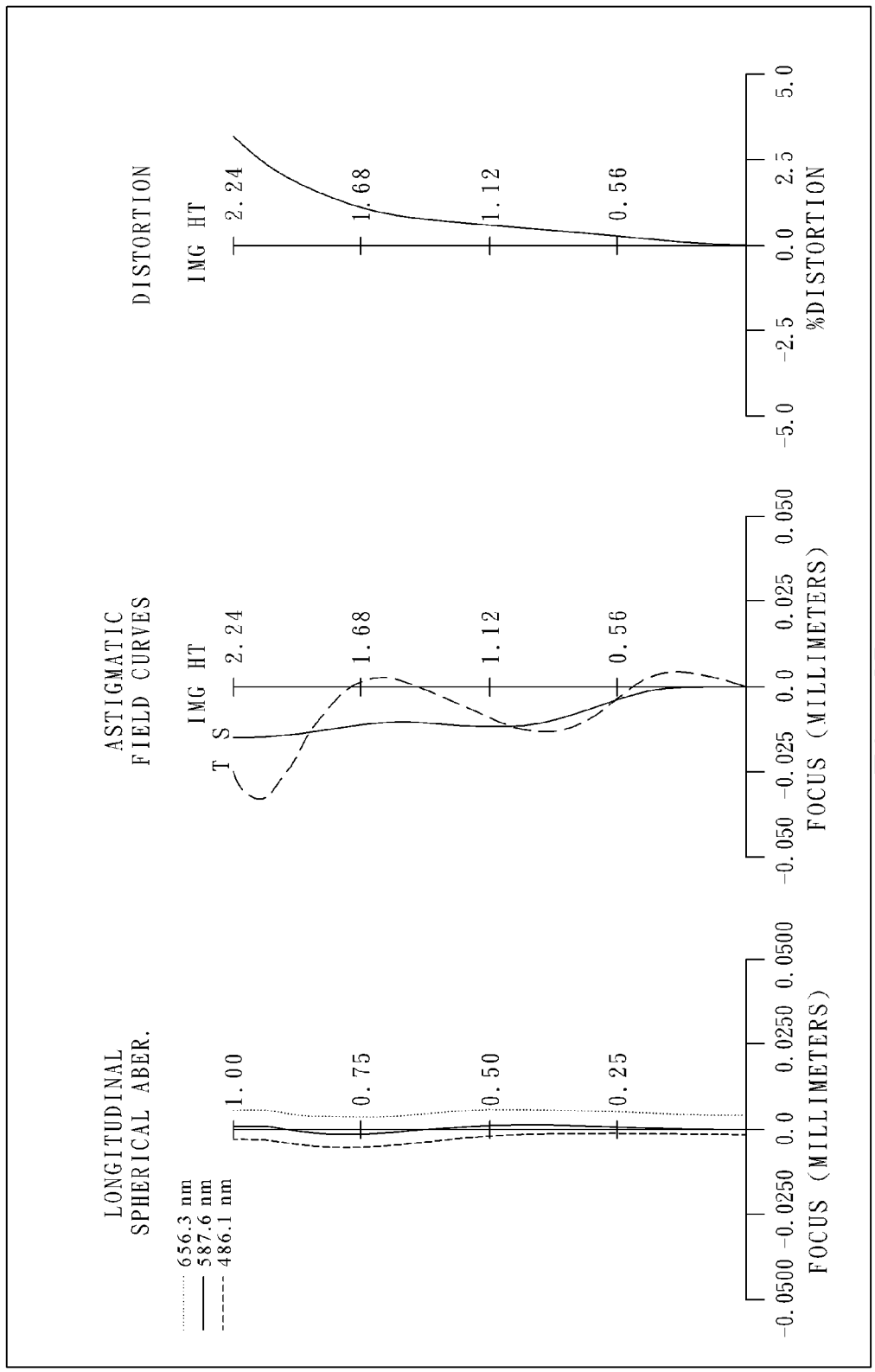
FIG. 8B shows the aberration curves of the eighth embodiment of the present disclosure.

FIG. 8A shows an optical image capturing lens assembly in accordance with an eighth embodiment of the present disclosure, and FIG. 8B shows the aberration curves of the eighth embodiment of the present disclosure. In the eighth embodiment of the present disclosure, there is an optical image capturing lens assembly mainly comprising six lens elements, in order from an object side to an image side:

a plastic first lens element 810 with positive refractive power having a concave object-side surface 811 and a convex image-side surface 812, the object-side surface 811 and the image-side surface 812 thereof being aspheric;

a plastic second lens element 820 with negative refractive power having a convex object-side surface 821 and a concave image-side surface 822, the object-side surface 821 and the image-side surface 822 thereof being aspheric;

a plastic third lens element 830 with positive refractive power having a convex object-side surface 831 and a convex image-side surface 832, the object-side surface 831 and the image-side surface 832 thereof being aspheric;

a plastic fourth lens element 840 with negative refractive power having a convex object-side surface 841 and a concave image-side surface 842, the object-side surface 841 and the image-side surface 842 thereof being aspheric;

a plastic fifth lens element 850 with positive refractive power having a concave object-side surface 851 and a convex image-side surface 852, the object-side surface 851 and the image-side surface 852 thereof being aspheric; and a plastic sixth lens element 860 with negative refractive power having a convex object-side surface 861 and a concave image-side surface 862 on which at least one inflection point is formed, the object-side surface 861 and the image-side surface 862 thereof being aspheric.

The optical image capturing lens assembly is also provided with a stop 800 disposed between the first lens element 810 and the second lens element 820.

The optical image capturing lens assembly further comprises an IR-filter 870 disposed between the image-side surface 862 of the sixth lens element 860 and an image plane 881; the IR-filter 870 is made of glass and has no influence on the focal length of the optical image capturing lens assembly. Moreover, an image sensor 880 is disposed on the image plane 881.

The detailed optical data of the eighth embodiment is shown in TABLE 21, and the aspheric surface data is shown in TABLE 22, wherein the units of the radius of curvature, the thickness and the focal length are expressed in mm, and HFOV is half of the maximal field of view.

TABLE 21

(Embodiment 8)
f = 3.22 mm, Fno = 2.80, HFOV = 34.0 deg.

| Surface # | | Radius of Curvature | Thickness | Material | Refractive Index | Abbe # | Focal Length |
|---|---|---|---|---|---|---|---|
| 0 | Imaged Object | Plano | Infinity | | | | |
| 1 | Lens 1 | −62.500000 (ASP) | 0.477 | Plastic | 1.544 | 55.9 | 3.27 |

TABLE 21-continued (Embodiment 8)
f = 3.22 mm, Fno = 2.80, HFOV = 34.0 deg.

| Surface # | | Radius of Curvature | Thickness | Material | Refractive Index | Abbe # | Focal Length |
|---|---|---|---|---|---|---|---|
| 2 | | −1.733680 (ASP) | −0.071 | | | | |
| 3 | Stop | Plano | 0.245 | | | | |
| 4 | Lens 2 | 2.409620 (ASP) | 0.343 | Plastic | 1.650 | 21.4 | −4.85 |
| 5 | | 1.288430 (ASP) | 0.228 | | | | |
| 6 | Lens 3 | 8.665400 (ASP) | 0.493 | Plastic | 1.544 | 55.9 | 7.77 |
| 7 | | −8.098400 (ASP) | 0.150 | | | | |
| 8 | Lens 4 | 4.620700 (ASP) | 0.289 | Plastic | 1.614 | 25.6 | −14.57 |
| 9 | | 2.975010 (ASP) | 0.196 | | | | |
| 10 | Lens 5 | −4.121700 (ASP) | 0.461 | Plastic | 1.544 | 55.9 | 3.01 |
| 11 | | −1.218300 (ASP) | 0.137 | | | | |
| 12 | Lens 6 | 3.313300 (ASP) | 0.706 | Plastic | 1.514 | 56.8 | −3.45 |
| 13 | | 1.070160 (ASP) | 0.500 | | | | |
| 14 | IR-filter | Plano | 0.200 | Glass | 1.517 | 64.2 | — |
| 15 | | Plano | 0.191 | | | | |
| 16 | Image Plane | Plano | — | | | | |

* Reference Wavelength is d-line 587.6 nm

TABLE 22

Aspheric Coefficients

| Surface # | 1 | 2 | 4 | 5 | 6 | 7 |
|---|---|---|---|---|---|---|
| k = | −1.96538E+01 | −8.66069E+00 | −1.59045E+01 | −4.27272E+00 | −3.45802E+00 | −2.00000E+01 |
| A4 = | −5.98784E−02 | −9.28055E−02 | 7.46468E−02 | −5.31186E−02 | 8.53517E−03 | −8.30613E−02 |
| A6 = | −9.32817E−02 | −1.07523E−01 | −3.08145E−01 | −5.79004E−02 | 4.57852E−04 | −6.89247E−02 |
| A8 = | 1.58021E−01 | 1.80730E−01 | 4.03065E−01 | −1.14861E−01 | −1.05887E−01 | 8.37811E−02 |
| A10 = | −3.22428E−01 | −1.40980E−01 | −6.76638E−01 | 5.83273E−02 | 2.95051E−02 | −2.70006E−01 |
| A12 = | 1.85673E−01 | −8.08661E−02 | 8.27203E−01 | 2.15383E−04 | −1.79356E−05 | 3.55949E−01 |
| A14 = | −2.53304E−02 | 9.99106E−03 | −3.88299E−01 | | | −1.46743E−01 |

| Surface # | 8 | 9 | 10 | 11 | 12 | 13 |
|---|---|---|---|---|---|---|
| k = | −1.00000E+00 | −1.00000E+00 | 1.01914E+01 | −5.22277E+00 | −1.00000E+00 | −4.93679E+00 |
| A4 = | −2.17330E−01 | −2.12483E−01 | 1.17011E−01 | −6.79714E−02 | −1.77612E−01 | −1.12027E−01 |
| A6 = | −1.86540E−01 | −3.30401E−02 | 3.83202E−02 | 1.85136E−01 | −8.19493E−03 | 3.76893E−02 |
| A8 = | 4.02798E−01 | 1.34630E−01 | −2.15807E−01 | −1.23768E−01 | 3.96939E−02 | −1.24325E−02 |
| A10 = | −3.64133E−01 | −7.45889E−02 | 3.01869E−01 | 6.50748E−02 | −9.48961E−03 | 2.84574E−03 |
| A12 = | 1.59262E−01 | 3.71421E−02 | −1.73534E−01 | −1.76647E−02 | −2.21593E−03 | −4.26380E−04 |
| A14 = | −2.00935E−02 | −9.35108E−03 | 3.88854E−02 | 6.65599E−04 | 1.00118E−03 | 2.33846E−05 |

The equation of the aspheric surface profiles of the eighth embodiment has the same form as that of the first embodiment. Moreover, the definitions of the parameters of the relations are the same as those set forth in the first embodiment, but the values of the relations of the eighth embodiment are listed in TABLE 23 below:

TABLE 23

(Embodiment 8)

| f | 3.22 | R12/f | 0.33 |
|---|---|---|---|
| Fno | 2.80 | |f1/f3| | 0.42 |
| HFOV | 34.0 | (|f/f3| + |f/f4|)/(|f/f5| + |f/f6|) | 0.32 |
| V1 − V2 | 34.5 | SD/TD | 0.89 |
| T1/T56 | 1.27 | Yc/ImgH | 0.54 |
| ΣCT/Td | 0.76 | TTL/ImgH | 2.06 |
| R2/|R1| | −0.03 | | |

Embodiment 9

Figure 9A:
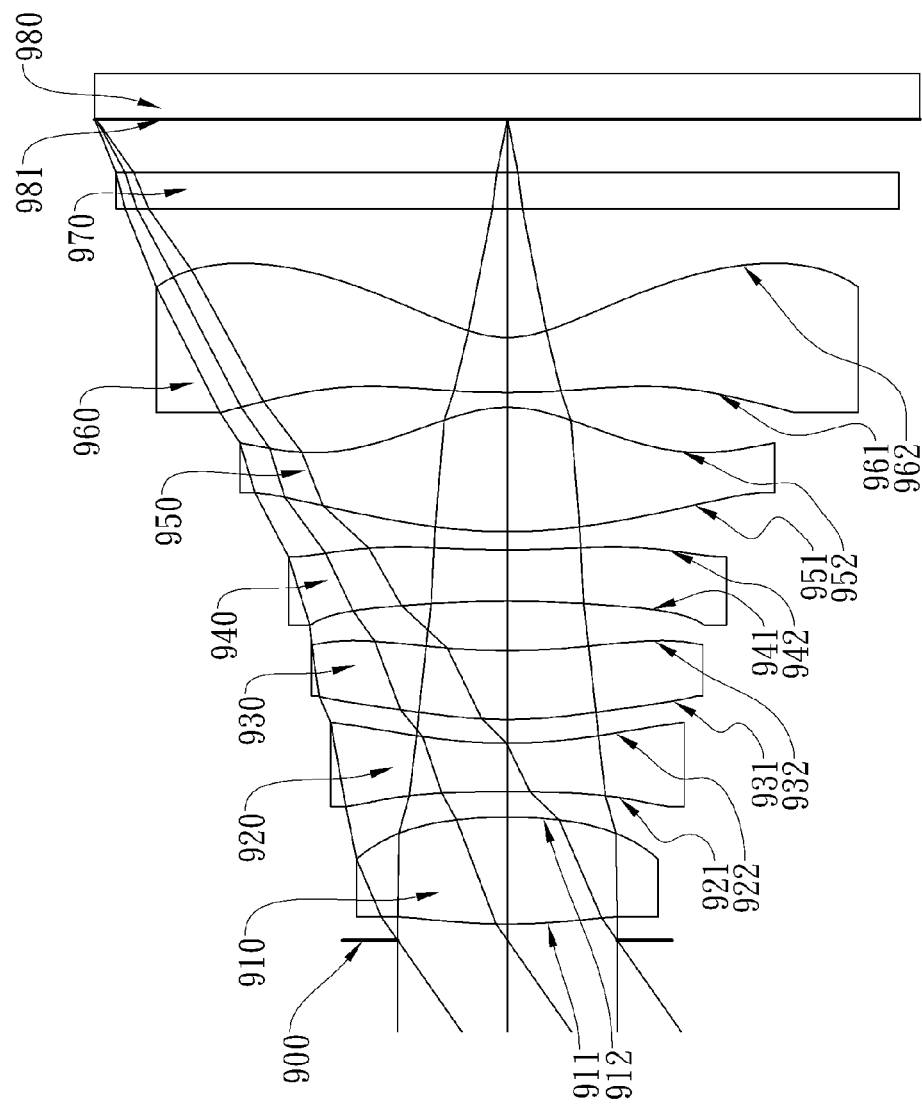
FIG. 9A shows an optical image capturing lens assembly in accordance with a ninth embodiment of the present disclosure.
Figure 9B:
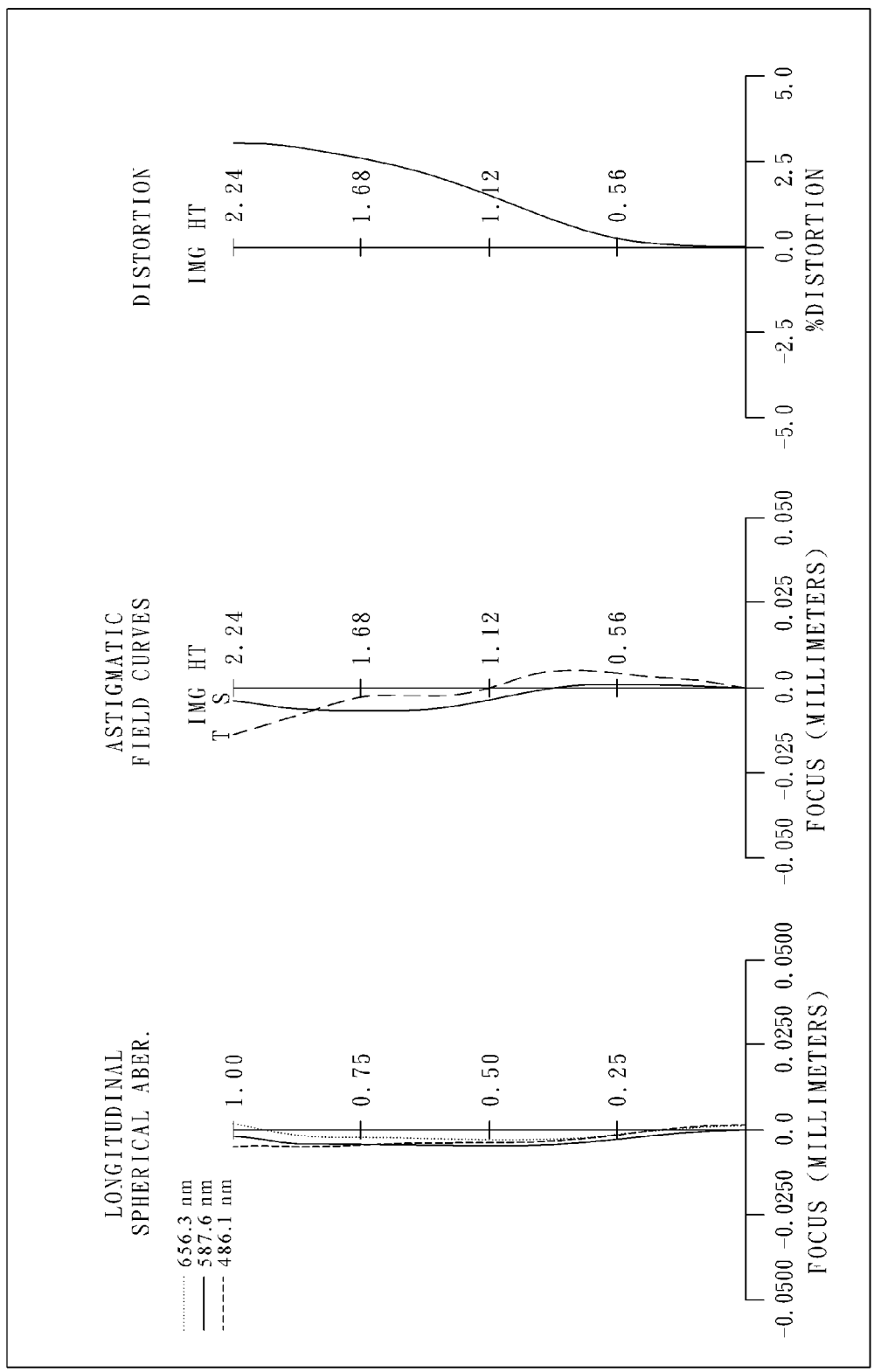
FIG. 9B shows the aberration curves of the ninth embodiment of the present disclosure.

FIG. 9A shows an optical image capturing lens assembly in accordance with a ninth embodiment of the present disclosure, and FIG. 9B shows the aberration curves of the ninth embodiment of the present disclosure. In the ninth embodiment of the present disclosure, there is an optical image capturing lens assembly mainly comprising six lens elements, in order from an object side to an image side:

a first lens element 910 with positive refractive power made of glass and having a convex object-side surface 911 and a convex image-side surface 912, the object-side surface 911 and the image-side surface 912 thereof being aspheric;

a plastic second lens element 920 with negative refractive power having a concave object-side surface 921 and a concave image-side surface 922, the object-side surface 921 and the image-side surface 922 thereof being aspheric;

a plastic third lens element 930 with positive refractive power having a convex object-side surface 931 and a concave image-side surface 932, the object-side surface 931 and the image-side surface 932 thereof being aspheric;

a plastic fourth lens element 940 with negative refractive power having a concave object-side surface 941 and a concave image-side surface 942, the object-side surface 941 and the image-side surface 942 thereof being aspheric;

a plastic fifth lens element 950 with positive refractive power having a convex object-side surface 951 and a convex image-side surface 952, the object-side surface 951 and the image-side surface 952 thereof being aspheric; and a plastic sixth lens element 960 with negative refractive power having a convex object-side surface 961 and a concave image-side surface 962 on which at least one inflection point is formed, the object-side surface 961 and the image-side surface 962 thereof being aspheric.

The optical image capturing lens assembly is also provided with a stop 900 disposed between an imaged object and the first lens element 910.

The optical image capturing lens assembly further comprises an IR-filter 970 disposed between the image-side surface 962 of the sixth lens element 960 and an image plane 981; the IR-filter 970 is made of glass and has no influence on the focal length of the optical image capturing lens assembly. Moreover, an image sensor 980 is disposed on the image plane 981.

The detailed optical data of the ninth embodiment is shown in TABLE 24, and the aspheric surface data is shown in TABLE 25, wherein the units of the radius of curvature, the thickness and the focal length are expressed in mm, and HFOV is half of the maximal field of view.

TABLE 24

(Embodiment 9)
f = 3.11 mm, Fno = 2.60, HFOV = 35.0 deg.

| Surface # | | Radius of Curvature | Thickness | Material | Refractive Index | Abbe # | Focal Length |
|---|---|---|---|---|---|---|---|
| 0 | Imaged Object | Plano | Infinity | | | | |
| 1 | Stop | Plano | 0.088 | | | | |
| 2 | Lens 1 | 3.169400 (ASP) | 0.585 | Glass | 1.583 | 46.5 | 2.55 |
| 3 | | −2.610690 (ASP) | 0.137 | | | | |
| 4 | Lens 2 | −10.432100 (ASP) | 0.265 | Plastic | 1.634 | 23.8 | −3.33 |
| 5 | | 2.669220 (ASP) | 0.129 | | | | |
| 6 | Lens 3 | 2.354340 (ASP) | 0.376 | Plastic | 1.535 | 56.3 | 11.95 |
| 7 | | 3.520500 (ASP) | 0.270 | | | | |
| 8 | Lens 4 | −5.710000 (ASP) | 0.280 | Plastic | 1.583 | 30.2 | −4.67 |
| 9 | | 5.300100 (ASP) | 0.100 | | | | |
| 10 | Lens 5 | 2.893330 (ASP) | 0.678 | Plastic | 1.535 | 56.3 | 1.10 |
| 11 | | −0.677660 (ASP) | 0.080 | | | | |
| 12 | Lens 6 | 3.975800 (ODD) | 0.300 | Plastic | 1.535 | 56.3 | −1.16 |
| 13 | | 0.521500 (ASP) | 0.700 | | | | |
| 14 | IR-filter | Plano | 0.200 | Glass | 1.517 | 64.2 | — |
| 15 | | Plano | 0.290 | | | | |
| 16 | Image Plane | Plano | — | | | | |

* Reference Wavelength is d-line 587.6 nm

TABLE 25

| Aspheric Coefficients | | | | | | |
|---|---|---|---|---|---|---|
| Surface # | 2 | 3 | 4 | 5 | 6 | 7 |
| k = | −2.00000E+01 | 4.31301E−01 | 3.00000E+00 | −1.68749E+01 | −1.40273E+01 | 3.00000E+00 |
| A4 = | −8.21612E−03 | −1.32051E−01 | −5.41573E−02 | 1.23465E−02 | −8.00814E−02 | −6.06045E−02 |
| A6 = | −2.07766E−01 | −1.54855E−01 | −2.20397E−01 | −4.24505E−02 | −2.14315E−02 | −1.22158E−01 |
| A8 = | 1.75482E−01 | 8.50588E−02 | 4.13782E−01 | 1.30176E−01 | 2.54752E−01 | 1.28985E−01 |
| A10 = | −5.52276E−01 | 2.34028E−02 | −6.37300E−01 | −3.69440E−01 | −3.10802E−01 | −7.76886E−02 |
| A12 = | 2.65395E−01 | −1.15848E−01 | 9.44473E−01 | 3.87016E−01 | 1.27767E−01 | 1.87110E−02 |
| A14 = | −9.01784E−03 | 2.89843E−02 | −5.03563E−01 | −1.31105E−01 | | |

| Surface # | 8 | 9 | 10 | 11 | 12 | 13 |
|---|---|---|---|---|---|---|
| k = | 2.50887E+01 | −2.00000E+01 | 8.48354E−01 | −5.42491E+00 | −1.00000E+00 | −4.54296E+00 |
| A4 = | 5.64813E−02 | −1.36750E−01 | −4.63454E−02 | 5.41744E−02 | −1.14598E−01 | −9.05719E−02 |
| A6 = | 6.24027E−02 | 4.97733E−03 | 1.44556E−03 | 1.26532E−01 | −2.03441E−02 | 3.14118E−02 |
| A8 = | −2.35509E−01 | 2.62172E−02 | −6.06470E−04 | −1.28553E−01 | 3.35986E−02 | −9.32199E−03 |
| A10 = | 2.75929E−01 | 9.08476E−03 | 3.59554E−03 | 6.35009E−02 | −5.97963E−03 | 1.96211E−03 |
| A12 = | −1.81762E−01 | −5.77889E−03 | −1.82244E−03 | −1.79541E−02 | −1.61104E−03 | −2.84730E−04 |
| A14 = | 5.09291E−02 | | | 2.17995E−03 | 4.44866E−04 | 1.55268E−05 |

The equation of the aspheric surface profiles of the ninth embodiment has the same form as that of the first embodiment. Moreover, the definitions of the parameters of the relations are the same as those set forth in the first embodiment, but the values of the relations of the ninth embodiment are listed in TABLE 26 below:

TABLE 26

(Embodiment 9)

| f | 3.11 | R12/f | 0.17 |
|---|---|---|---|
| Fno | 2.60 | \|f1/f3\| | 0.21 |
| HFOV | 35.0 | (\|f/f3\| + \|f/f4\|)/(\|f/f5\| + \|f/f6\|) | 0.17 |
| V1 − V2 | 22.7 | SD/TD | 1.03 |
| T1/T56 | 1.71 | Yc/ImgH | 0.65 |
| ΣCT/Td | 0.78 | TTL/ImgH | 1.93 |
| R2/\|R1\| | −0.82 | | |

It is to be noted that TABLES 1-26 show different data of the different embodiments, however, the data of the different embodiments are obtained from experiments. Therefore, any optical image capturing lens assembly of the same structure is considered to be within the scope of the present disclosure even if it uses different data. The embodiments depicted above and the appended drawings are exemplary and are not intended to limit the scope of the present disclosure.

What is claimed is:

1. An optical image capturing lens assembly comprising, in order from an object side to an image side:
   a first lens element with positive refractive power having a convex image-side surface;
   a second lens element;
   a third lens element;
   a fourth lens element, at least one of an object-side surface and an image-side surface thereof being aspheric;
   a fifth lens element, at least one of an object-side surface and an image-side surface thereof being aspheric; and
   a sixth lens element with negative refractive power having a concave image-side surface, at least one of an object-side surface and the image-side surface thereof being aspheric, at least one inflection point being formed on at least one of the object-side surface and the image-side surface thereof; wherein the optical image capturing lens assembly further comprises a stop; and wherein a radius of curvature of the image-side surface of the first lens element is R2, a radius of curvature of an object-side surface of the first lens element is R1, an axial distance between the stop and the image-side surface of the sixth lens element is SD, an axial distance between the object-side surface of the first lens element and the image-side surface of the sixth lens element is TD, and they satisfy the following relations: −1.0<R2/|R1|<0; and 0.7<SD/TD<1.2.

2. The optical image capturing lens assembly according to claim 1, wherein the second lens element has negative refractive power.

3. The optical image capturing lens assembly according to claim 2, wherein a radius of curvature of the image-side surface of the sixth lens element is R12, a focal length of the optical image capturing lens assembly is f, and they satisfy the following relation: 0<R12/f<1.0.

4. The optical image capturing lens assembly according to claim 3, wherein a focal length of the first lens element is f1, a focal length of the third lens element is f3, and they satisfy the following relation: |f1/f3|<1.0.

5. The optical image capturing lens assembly according to claim 3, wherein a sum of axial thickness of all lens elements is ΣCT, the axial distance between the object-side surface of the first lens element and the image-side surface of the sixth lens element is TD, and they satisfy the following relation: 0.65<ΣCT/TD<0.85.

6. The optical image capturing lens assembly according to claim 4, wherein the fifth lens element has positive refractive power and the image-side surface thereof is convex, and the second lens element has a concave image-side surface.

7. The optical image capturing lens assembly according to claim 4, wherein the object-side surface of the first lens element is convex, and the fourth and fifth lens elements are made of plastic.

8. The optical image capturing lens assembly according to claim 4, wherein an Abbe number of the first lens element is V1, an Abbe number of the second lens element is V2, and they satisfy the following relation: 20<V1−V2<45.

9. The optical image capturing lens assembly according to claim 4, wherein the object-side surface of the first lens element is convex, and wherein the radius of curvature of the image-side surface of the sixth lens element is R12, the focal length of the optical image capturing lens assembly is f, and they satisfy the following relation: 0.1<R12/f<0.5.

10. The optical image capturing lens assembly according to claim 9, wherein the fifth lens element has positive refractive power and the object-side surface of the sixth lens element is convex, and wherein each of the first, second, third, fourth, fifth and sixth lens elements is made of plastic material and the object-side and image-side surfaces thereof are aspheric.

11. The optical image capturing lens assembly according to claim 4, wherein the axial distance between the stop and the image-side surface of the sixth lens element is SD, the axial distance between the object-side surface of the first lens element and the image-side surface of the sixth lens element is TD, the focal length of the first lens element is f1, the focal length of the third lens element is f3, and they satisfy the following relations: 0.9<SD/TD<1.2; and |f1/f3|<0.5.

12. The optical image capturing lens assembly according to claim 4, wherein the focal length of the optical image capturing lens assembly is f, the focal length of the third lens element is f3, a focal length of the fourth lens element is f4, a focal length of the fifth lens element is f5, a focal length of the sixth lens element is f6, and they satisfy the relation: 0<(|f/f3|+|f/f4|)/(|f/f5|+|f/f6|)<0.4.

13. The optical image capturing lens assembly according to claim 2 further comprising an image sensor disposed on an image plane, wherein a vertical distance between a point with its tangent being perpendicular to the optical axis on the image-side surface of the sixth lens element and the optical axis is Yc, half of a diagonal length of an effective photosensitive area of the image sensor is ImgH, and they satisfy the following relation: 0.4<Yc/ImgH<0.9.

14. The optical image capturing lens assembly according to claim 13, wherein an axial distance between the object-side surface of the first lens element and the image plane is TTL, half of the diagonal length of the effective photosensitive area of the image sensor is ImgH, and they satisfy the following relation: TTL/ImgH<2.2.

15. An optical image capturing lens assembly comprising, in order from an object side to an image side:
   a first lens element with positive refractive power having a convex image-side surface;
   a second lens element with negative refractive power;
   a third lens element;
   a fourth lens element;

a fifth lens element with positive refractive power having a convex image-side surface, at least one of an object-side surface and the image-side surface thereof being aspheric; and a sixth lens element with negative refractive power having a concave image-side surface, at least one of an object-side surface and the image-side surface thereof being aspheric, at least one inflection point being formed on at least one of the object-side surface and the image-side surface thereof; wherein the optical image capturing lens assembly further comprises an image sensor disposed on an image plane; and wherein a radius of curvature of the image-side surface of the first lens element is R2, a radius of curvature of an object-side surface of the first lens element is R1, a vertical distance between a point with its tangent being perpendicular to the optical axis on the image-side surface of the sixth lens element and the optical axis is Yc, half of a diagonal length of an effective photosensitive area of the image sensor is ImgH, and they satisfy the following relations: $-1.0 < R2/|R1| < 0$; and $0.4 < Yc/ImgH < 0.9$.

16. The optical image capturing lens assembly according to claim 15, wherein an Abbe number of the first lens element is V1, an Abbe number of the second lens element is V2, and they satisfy the following relation: $20 < V1-V2 < 45$.

17. The optical image capturing lens assembly according to claim 16 further comprising a stop, wherein an axial distance between the stop and the image-side surface of the sixth lens element is SD, an axial distance between the object-side surface of the first lens element and the image-side surface of the sixth lens element is TD, an axial distance between the first lens element and the second lens element is T12, an axial distance between the fifth lens element and the sixth lens element is T56, and they satisfy the following relations: $0.9 < SD/TD < 1.2$; and $0.3 < T12/T56 < 2.5$.

18. The optical image capturing lens assembly according to claim 16, wherein a focal length of the optical image capturing lens assembly is f, a focal length of the third lens element is f3, a focal length of the fourth lens element is f4, a focal length of the fifth lens element is f5, a focal length of the sixth lens element is f6, and they satisfy the following relation: $0 < (|f/f3|+|f/f4|)/(|f/f5|+|f/f6|) < 0.4$.

19. The optical image capturing lens assembly according to claim 15 further comprising a stop, wherein an axial distance between the stop and the image-side surface of the sixth lens element is SD, an axial distance between the object-side surface of the first lens element and the image-side surface of the sixth lens element is TD, a radius of curvature of the image-side surface of the sixth lens element is R12, a focal length of the optical image capturing lens assembly is f, and they satisfy the following relations: $0.7 < SD/TD < 1.2$; and $0.1 < R12/f < 0.5$.

20. The optical image capturing lens assembly according to claim 19, wherein the object-side surface of the sixth lens element is convex, and wherein a focal length of the first lens element is f1, a focal length of the third lens element is f3, and they satisfy the following relation: $|f1/f3| < 0.5$.

21. The optical image capturing lens assembly according to claim 19, wherein an axial distance between the object-side surface of the first lens element and the image plane is TTL, half of the diagonal length of the effective photosensitive area of the image sensor is ImgH, and they satisfy the following relation: $TTL/ImgH < 2.2$.

* * * * *